(12) United States Patent
Das Sharma

(10) Patent No.: US 11,249,837 B2
(45) Date of Patent: *Feb. 15, 2022

(54) FLIT-BASED PARALLEL-FORWARD ERROR CORRECTION AND PARITY

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/575,739

(22) Filed: Sep. 19, 2019

(65) Prior Publication Data

US 2020/0012555 A1    Jan. 9, 2020

Related U.S. Application Data

(60) Provisional application No. 62/837,318, filed on Apr. 23, 2019, provisional application No. 62/812,507, filed on Mar. 1, 2019.

(51) Int. Cl.
*G06F 11/10*    (2006.01)
*G06F 13/42*    (2006.01)
(Continued)

(52) U.S. Cl.
CPC ........ *G06F 11/1004* (2013.01); *G06F 11/076* (2013.01); *G06F 11/1402* (2013.01);
(Continued)

(58) Field of Classification Search
CPC ............. G06F 11/1004; G06F 13/4221; G06F 11/1402; G06F 11/076; H04L 1/1812;
(Continued)

(56) References Cited

U.S. PATENT DOCUMENTS 6,400,728 B1    6/2002 Ott
6,411,654 B1    6/2002 Furutani et al.
(Continued)

FOREIGN PATENT DOCUMENTS

EP    1253729 A2    10/2002
EP    2634983 A2    9/2013
(Continued)

OTHER PUBLICATIONS

Jiajia Jiao and Yuzhuo Fu, "A cost-effective method for masking transient errors in NoC flit type," 2013 IEEE 10th International Conference on ASIC, Shenzhen, 2013, pp. 1-4. (Year: 2013).*
(Continued)

*Primary Examiner* — Cynthia Britt
(74) *Attorney, Agent, or Firm* — Alliance IP, LLC

(57) ABSTRACT

A flit-based packetization approach is used for transmitting information between electronic components. A protocol stack can generate transaction layer packets from information received from a transmitting device, assemble the transaction layer packets into one or more flits, and protect the flits with a flit-level cyclic redundancy check (CRC) scheme and a flit-level forward error correction or parallel-forward error correction (FEC) scheme. Flit-level FEC schemes can provide improved latencies and efficiencies over per-lane FEC schemes. To improve retry probability, flits can contain information indicating whether immediately preceding flits are null flits. Receivers can avoid sending a retry request for a corrupted flit if a seceding flit indicates the corrupted flit is a null fit. Parity flits can be used to protect groups of flits and correct single-flit errors.

25 Claims, 22 Drawing Sheets

(51) Int. Cl.
*G06F 11/14* (2006.01)
*G06F 11/07* (2006.01)
*H04L 1/18* (2006.01)
*H04L 1/00* (2006.01)

(52) U.S. Cl.
CPC .......... *G06F 13/4221* (2013.01); *H04L 1/009* (2013.01); *H04L 1/0041* (2013.01); *H04L 1/0061* (2013.01); *H04L 1/0083* (2013.01); *H04L 1/1812* (2013.01)

(58) Field of Classification Search
CPC ..... H04L 1/0083; H04L 1/009; H04L 1/0061; H04L 1/0045; H04L 1/0071; H04L 1/0041
See application file for complete search history.

(56) References Cited

U.S. PATENT DOCUMENTS

| | | | |
|---|---|---|---|
| 7,124,333 B2* | 10/2006 | Fukushima | H04L 1/1838 714/701 |
| 7,127,653 B1 | 10/2006 | Gorshe | |
| 7,958,431 B2 | 6/2011 | Hollums | |
| 7,995,696 B1 | 8/2011 | Norrie | |
| 8,400,728 B2 | 3/2013 | Thompson et al. | |
| 8,417,847 B2 | 4/2013 | McNutt et al. | |
| 9,311,268 B1 | 4/2016 | Chen et al. | |
| 10,210,040 B2 | 2/2019 | Circello et al. | |
| 10,250,436 B2 | 4/2019 | Sharma | |
| 10,372,647 B2 | 8/2019 | Lovett et al. | |
| 10,771,189 B2 | 9/2020 | Sharma | |
| 10,784,986 B2 | 9/2020 | Sharma | |
| 2003/0110422 A1 | 6/2003 | Naffziger et al. | |
| 2003/0198252 A1 | 10/2003 | Thrysoe | |
| 2004/0264960 A1 | 12/2004 | Maciocco et al. | |
| 2005/0063701 A1 | 3/2005 | Ovadia et al. | |
| 2005/0160346 A1 | 7/2005 | Yamane | |
| 2005/0172091 A1 | 8/2005 | Rotithor et al. | |
| 2005/0193312 A1 | 9/2005 | Smith et al. | |
| 2006/0123328 A1 | 6/2006 | Tonami et al. | |
| 2007/0098007 A1 | 5/2007 | Prodan et al. | |
| 2007/0229327 A1 | 10/2007 | Chen et al. | |
| 2008/0008471 A1 | 1/2008 | Dress | |
| 2008/0140686 A1 | 6/2008 | Hong et al. | |
| 2008/0141095 A1 | 6/2008 | Cai et al. | |
| 2009/0201805 A1 | 8/2009 | Begen et al. | |
| 2009/0241009 A1 | 9/2009 | Kong et al. | |
| 2009/0276686 A1 | 11/2009 | Liu et al. | |
| 2010/0036997 A1 | 2/2010 | Brewer et al. | |
| 2010/0229071 A1 | 9/2010 | Ganga et al. | |
| 2011/0099411 A1 | 4/2011 | Lin | |
| 2011/0134909 A1 | 6/2011 | Huang et al. | |
| 2011/0219279 A1* | 9/2011 | Abu-Surra | H03M 13/2906 714/746 |
| 2012/0119753 A1 | 5/2012 | Kim | |
| 2012/0137184 A1 | 5/2012 | Nakamura | |
| 2012/0240017 A1 | 9/2012 | Uchida | |
| 2012/0314586 A1 | 12/2012 | Yamamoto et al. | |
| 2013/0246878 A1 | 9/2013 | Pancholi et al. | |
| 2014/0006677 A1 | 1/2014 | Iyer et al. | |
| 2014/0112339 A1* | 4/2014 | Safranek | G06F 9/30145 370/389 |
| 2014/0115374 A1 | 4/2014 | Iyer et al. | |
| 2014/0115420 A1 | 4/2014 | Willey et al. | |
| 2014/0122963 A1 | 5/2014 | Motwani et al. | |
| 2014/0126580 A1 | 5/2014 | Sampath et al. | |
| 2015/0163170 A1 | 6/2015 | Birrittella | |
| 2015/0222533 A1 | 8/2015 | Birrittella et al. | |
| 2015/0256288 A1 | 9/2015 | Tanaka et al. | |
| 2015/0309873 A1 | 10/2015 | Yoon et al. | |
| 2015/0347015 A1 | 12/2015 | Pawlowski | |
| 2016/0085619 A1 | 3/2016 | Iyer et al. | |
| 2016/0099795 A1 | 4/2016 | Lusted et al. | |
| 2016/0179427 A1 | 6/2016 | Jen et al. | |
| 2016/0179610 A1 | 6/2016 | Morris et al. | |
| 2016/0179647 A1 | 6/2016 | Sharma et al. | |
| 2016/0179710 A1 | 6/2016 | Sharma et al. | |
| 2016/0179718 A1* | 6/2016 | Morris | G06F 13/28 710/308 |
| 2016/0179730 A1 | 6/2016 | Halleck et al. | |
| 2016/0182265 A1 | 6/2016 | Shulman et al. | |
| 2016/0248682 A1 | 8/2016 | Lee et al. | |
| 2016/0261375 A1 | 9/2016 | Roethig et al. | |
| 2016/0283112 A1 | 9/2016 | Blankenship | |
| 2016/0283303 A1 | 9/2016 | Sharma et al. | |
| 2016/0283375 A1 | 9/2016 | Sharma et al. | |
| 2016/0283388 A1 | 9/2016 | Blankenship et al. | |
| 2016/0283399 A1 | 9/2016 | Sharma | |
| 2016/0337079 A1 | 11/2016 | Ran | |
| 2016/0377679 A1 | 12/2016 | Froelich et al. | |
| 2017/0004098 A1 | 1/2017 | Sharma et al. | |
| 2017/0017604 A1 | 1/2017 | Chen et al. | |
| 2017/0034165 A1 | 2/2017 | Bagal et al. | |
| 2017/0141794 A1 | 5/2017 | Tyson et al. | |
| 2017/0163286 A1 | 6/2017 | Wu et al. | |
| 2017/0222686 A1 | 8/2017 | Khan et al. | |
| 2017/0270062 A1 | 9/2017 | Sharma | |
| 2017/0351795 A1 | 12/2017 | Ghattas et al. | |
| 2018/0083855 A1* | 3/2018 | Weiny | H04L 41/0668 |
| 2018/0095923 A1 | 4/2018 | Iyer et al. | |
| 2018/0191523 A1* | 7/2018 | Shah | H04B 3/36 |
| 2018/0205431 A1 | 7/2018 | Nammi | |
| 2018/0248650 A1 | 8/2018 | Sharma | |
| 2018/0254943 A1 | 9/2018 | Sharma | |
| 2019/0095380 A1 | 3/2019 | Sharma | |
| 2019/0149265 A1 | 5/2019 | Sharma | |
| 2019/0227972 A1 | 7/2019 | Hor et al. | |
| 2019/0243700 A1 | 8/2019 | Brewer | |
| 2019/0260504 A1* | 8/2019 | Philip | H04L 1/0045 |
| 2019/0294579 A1 | 9/2019 | Sharma | |
| 2019/0305888 A1 | 10/2019 | Sharma | |
| 2019/0372904 A1 | 12/2019 | Dress | |
| 2020/0145341 A1 | 5/2020 | Sharma | |
| 2020/0186414 A1 | 6/2020 | Sharma | |
| 2020/0226018 A1 | 7/2020 | Sharma | |
| 2020/0374037 A1 | 11/2020 | Sharma | |
| 2021/0006349 A1 | 1/2021 | Das | |

FOREIGN PATENT DOCUMENTS

| | | |
|---|---|---|
| JP | 2010187244 A | 8/2010 |
| WO | 2015099724 A1 | 7/2015 |
| WO | 2016053519 A1 | 4/2016 |
| WO | 2017014846 A1 | 1/2017 |

OTHER PUBLICATIONS

USPTO Non-Final Office Action in U.S. Appl. No. 16/439,582 dated Sep. 18, 2020 (13 pages).
Non-Final Office Action dated Jan. 10, 2020, for U.S. Appl. No. 16/439,582, 11 pages.
EPO Extended European Search Report in EP Application Serial No. 20153760.2 dated Mar. 26, 2020 (8 pages).
EPO Extended European Search Report in EP Application Serial No. 20153970.7 dated Mar. 26, 2020 (7 pages).
Feehrer, J., et al., "Implementation and modeling for high-performance I/0 Hub used in SPARC M7 processor-based servers", 2015 IEEE 9th International Symposium on Embedded Multicore/Many-core Systems-on-Chip, IEEE, Conference Location: Turin, Italy, Date of Conference: Sep. 23-25, 2015, pp. 275-282. (Year: 2015).
Srinivasan Murali et al: "Analysis of Error Recovery Schemes for Networks on Chips", IEEE Design & Test of Computers (vol. 22 , Issue: 5 , Sep.-Oct. 2005 ), Sep. 26, 2005 (Sep. 26, 2005), pp. 434-442, XP055628862, DOI: 10.1109/MDT.2005.104 Retrieved from the Internet: URL:https://ieeexplore.ieee.org/ielx5/54/32372/01511975.pdftp=&arnumber=151I~75&isnumber=323728ref=aHROcHMGLy9pZWVleHBsb3JlLmllZWUub3JnL2RvY3VtZW5OLzE.
USPTO Final Office Action in U.S. Appl. No. 16/439,582 dated May 1, 2020 (12 pages).

(56) References Cited

OTHER PUBLICATIONS

USPTO Non-Final Office Action in U.S. Appl. No. 16/224,583 dated Apr. 8, 2020 (8 pages).
USPTO Notice of Allowance in U.S. Appl. No. 16/224,583 dated May 12, 2020 (6 pages).
Chen, Ling-Jyh, et al. "Improving Wireless Link Throughput via Interleaved FEC", Ninth International Symposium on Computers and Communications, Alexandria, Egypt, Jul. 2004, 6 pages.
EPO; Extended European Search Report issued in EP Patent Application No. 18761600.8, dated Dec. 2, 2020; 7 pages.
EPO; Extended European Search Report issued in EP Patent Application No. 20150933.8, dated Jul. 17, 2020; 8 pages.
EPO; Extended European Search Report issued in EP Patent Application No. 20165292.2, dated Jul. 10, 2020; 11 pages.
PCT International Preliminary Reporton Patentability issued in PCT/US2018/019583, dated Sep. 3, 2019; 12 pages.
PCT International Search Report and Written Opinion in PCT/US2018/019702, dated Jun. 4, 2018, 11 pages.
PCT International Search Report and Written Opinion issued in PCT/US2018/019583, dated Jun. 5, 2018; 15 pages.
USPTO; Corrected Notice of Allowability issued in U.S. Appl. No. 15/640,449, dated Jun. 24, 2020; 6 pages.
USPTO; Non-Final Office Action issued in U.S. Appl. No. 15/446,395, dated Jun. 1, 2018; 5 pages.
USPTO; Non-Final Office Action issued in U.S. Appl. No. 15/640,449; dated Apr. 7, 2020; 10 pages.
USPTO; Notice of Allowance issued in U.S. Appl. No. 15/446,395, dated Nov. 21, 2018; 8 pages.
USPTO; Notice of Allowance issued in U.S. Appl. No. 15/640,449, dated May 11, 2020; 6 pages.
USPTO; Notice of Allowance issued in U.S. Appl. No. 16/439,582, dated Jan. 12, 2021; 9 pages.
USPTO; U.S. Appl. No. 17/134,240, filed Dec. 25, 2020; 60 pages.
Yao, Jun, et al., "PCIe Gen4 Standards Margin Assisted Outer Layer Equalization for Cross Lane Optimization in a 16GT/s PCIe Link", retrieved from the internet at https://www.researchgate.net/publication/316009959; DesignCon, Santa Clara, California; Feb. 2017; 27 pages.
EPO; Extended European Search Report issued in EP Patent Application No. 20194485.7, dated Mar. 1, 2021; 9 pages.
USPTO; Non-Final Office Action issued in U.S. Appl. No. 16/723,868, dated Mar. 29, 2021; 11 pages.
EPO; Extended European Search Report issued in EP Patent Application No. 21167765.3, dated Jul. 21, 2021; 8 pages.
EPO; Extended European Search Report issued in EP Patent Application No. 21150857.7, dated Jul. 13, 2021; 13 pages.
USPTO; Final Office Action issued in U.S. Appl. No. 16/723,868, dated Aug. 26, 2021; 24 pages.
USPTO; Non-Final Office Action issued in U.S. Appl. No. 16/428,841, dated Aug. 6, 2021; 9 pages.
USPTO; Non-Final Office Action issued U.S. Appl. No. 16/575,739; dated Sep. 9, 2021; 27 pages.
USPTO; Notice of Allowance issued in U.S. Appl. No. 16/991,681; dated Sep. 9, 2021; 51 pages.
USPTO; Notice of Allowance issued in U.S. Appl. No. 16/948,459, dated Jun. 10, 2021; 42 pages.
EPO; Extended European Search Report issued in EP Patent Application No. 20217123.7, dated Oct. 6, 2021; 13 pages.

* cited by examiner

| Link | x1 | x2 | x4 | x8 | x16 |
|---|---|---|---|---|---|
| FEC size per lane (B) | 324 | 162 | 81 | 81 | 81 |
| FEC symbols per interleave | 108 | 54 | 27 | 27 | 27 |
| Total flit size (B) | 324 | 324 | 324 | 648 | 1296 |
| FEC latency (ns) | 40.5 | 20.25 | 10.125 | 10.125 | 10.125 |
| FEC check symbols | 6 | 12 | 24 | 48 | 96 |
| CRC (B) | 8 | 8 | 8 | 8 | 8 |
| DLL payload (B) | 4 | 4 | 4 | 4 | 8 |
| TLP payload (B) | 306 | 300 | 288 | 600 | 1184 |
| TLP payload (DW (1DW=4B)) | 76.5 | 75 | 72 | 147 | 296 |
| TLP efficiency (%) | 94.4 | 92.6 | 88.9 | 90.7 | 91.4 |

| TLP Header (DW) | TLP Payload (B/DW) | TLP (DW) | TLP Efficiency (%) |
|---|---|---|---|
| 4 | 0/0 | 4 | 62.7 |
| 4 | 32/8 | 12 | 80.6 |
| 4 | 64/16 | 20 | 83.6 |
| 4 | 128/32 | 36 | 88.5 |
| 4 | 256/64 | 68 | 91.2 |
| 4 | 512/128 | 132 | 92.6 |
| 4 | 4K/1K | 1028 | 93.8 |

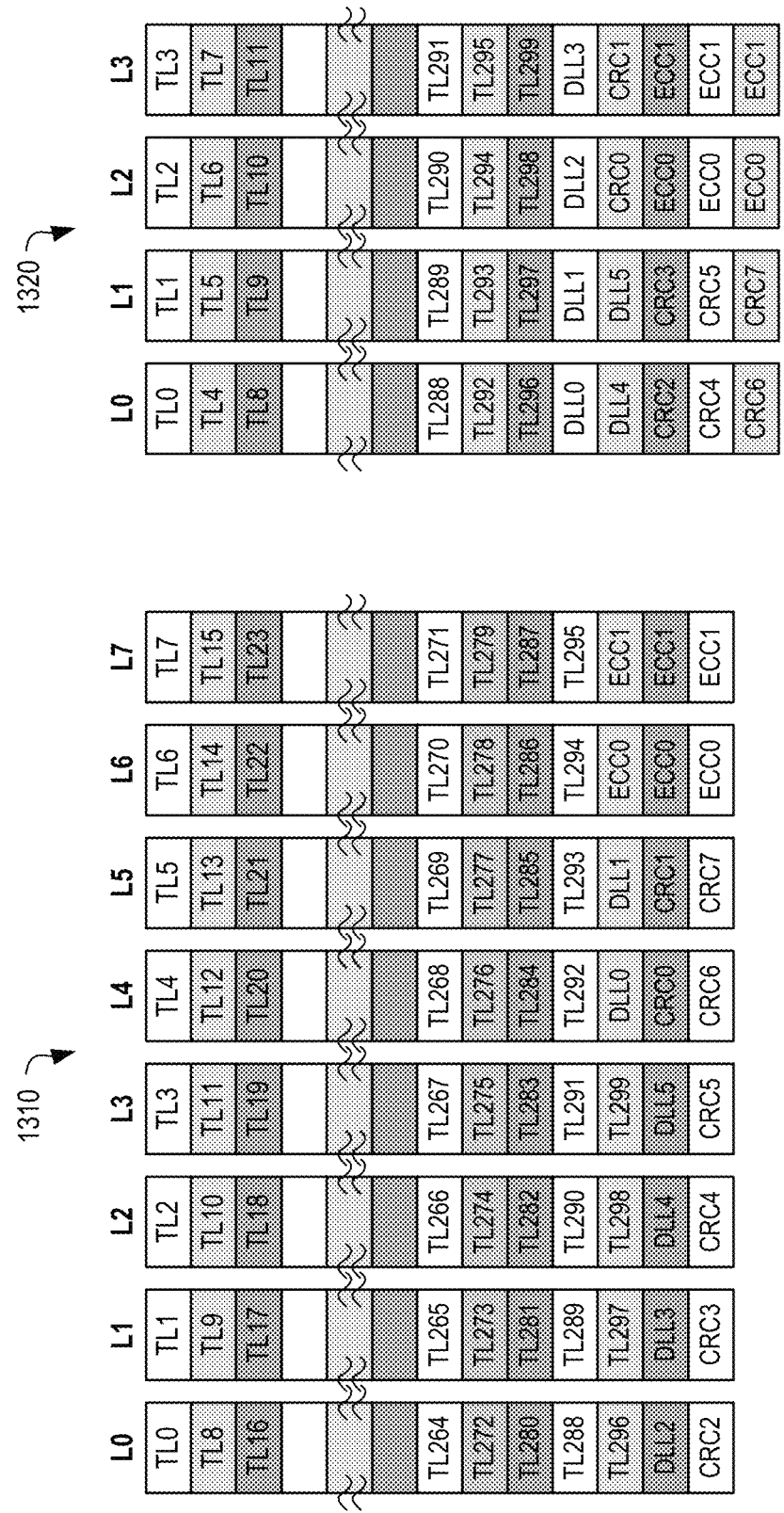

| Per-lane FEC | | | | |
|---|---|---|---|---|
| Raw Burst Error Probability | 1.000E-04 | 1.000E-05 | 1.000E-06 | 1.000E-07 |
| Bits in FEC | 648 | | | |
| | | | | |
| Retry probability / FEC code word in 1 lane | 2.010E-03 | 2.090E-05 | 2.100E-07 | 2.100E-09 |
| Retry probability / FEC code words in 8 lanes | 1.595E-02 | 1.670E-04 | 1.676E-06 | 1.677E-08 |
| Retry probability / FEC code words in 16 lanes | 3.165E-02 | 3.339E-04 | 3.353E-06 | 3.354E-08 |
| | | | | |
| Retry Round-Trip (ns) | 300 | | | |
| Retry Rount-Trip (flits) | 29.7 | | | |
| | | | | |
| Bandwidth loss (go-back-n) - 16 lanes (%) | 9.378E+01 | 9.894E-01 | 9.934E-03 | 9.938E-05 |
| Probability a flit is not affected by a retry (16 lanes) (%) | 6.144E-01 | 9.847E-03 | 9.933E-05 | 9.938E-07 |

FIG. 15A

| Flit-level FEC (x16) | | | | |
|---|---|---|---|---|
| Retry Time (ns) | 300 | | | |
| Raw Burst Error Probability | 1.000E-04 | 1.000E-05 | 1.000E-06 | 1.000E-07 |
| Correlation second lanes | 1.000E-03 | 1.000E-03 | 1.000E-03 | 1.000E-03 |
| Width of Link | 16 | 16 | 16 | 16 |
| Frequency (Ghz) | 64 | 64 | 64 | 64 |
| Bits per flit / lane | 160 | 160 | 160 | 160 |
| Prob 0 error / lane | 9.8413E-01 | 9.9841E-01 | 9.9984E-01 | 9.9998E-01 |
| Prob 1 error / lane | 1.5748E-02 | 1.5975E-03 | 1.5998E-04 | 1.6000E-05 |
| Prob 0 error all lanes / flit | 7.7413E-01 | 9.7472E-01 | 9.9744E-01 | 9.9974E-01 |
| Prob 1 error all lanes / flit | 1.9525E-01 | 2.4582E-02 | 2.5154E-03 | 2.5212E-04 |
| Retry probability / flit (>1 error in all lanes / flit) | 3.0623E-02 | 6.9371E-04 | 4.1308E-05 | 3.8450E-06 |
| Parity flit every n flits | 20 | 20 | 20 | 20 |
| Retry probability w/parity flit over n flits | 1.2396E-01 | 9.0676E-05 | 3.2400E-07 | 2.8089E-09 |
| | | | | |
| Number of flits over retry window | 120 | 120 | 120 | 120 |
| 0 uncorrected flit errors over retry window | 2.3941E-02 | 9.2010E-01 | 9.9506E-01 | 9.9995E-01 |
| 1 uncorrected flit errors over retry window | 9.0757E-02 | 7.6647E-02 | 4.9323E-03 | 4.6119E-04 |
| Retry probability over retry time (%) | 9.7606E-01 | 7.9901E-02 | 4.9444E-03 | 4.6130E-04 |
| Retry probability w/parity flit every retry time (%) | 8.8530E-01 | 3.2541E-03 | 1.2142E-05 | 1.0553E-07 |

RECEIVE FLIT OVER LANES OF LINK, FLIT COMPRISING TRANSACTION LAYER PACKETS, FLIT-LEVEL LEVEL CYCLIC REDUNDANCY CHECK (CRC) CODES, AND FLIT-LEVEL FORWARD ERROR CORRECTION (FEC) CODES  1910

DETERMINE WHETHER FLIT SUCCESSFULLY RECEIVED BASED ON FLIT-LEVEL CRC CODES AND FLIT-LEVEL FEC CODES  1920

SEND INFORMATION CONTAINED IN TRANSACTION LAYER PACKETS TO PROCESSOR IF FLIT SUCCESSFULLY RECEIVED  1930

Non-transitory computer readable storage medium 2210

Programming instructions 2220

FLIT-BASED PARALLEL-FORWARD ERROR CORRECTION AND PARITY

CROSS-REFERENCES TO RELATED APPLICATIONS

This application claims priority to, and the benefit of, U.S. Provisional Application No. 62/837,318, filed Apr. 23, 2019, and U.S. Provisional Application No. 62/812,507, filed Mar. 1, 2019, which are incorporated herein by reference.

BACKGROUND

The PCI Express protocol defines various packet types. Two of these are the Data Link Layer Packet (DLLP) and the Transaction Layer Packet (TLP). A DLLP has a fixed length of 8 bytes (8B) and TLPs have a variable length. As transmitted along a link, DLLPs and TLPs comprise three entities: the payload, a cyclic redundancy check added by the data link layer (LCRC), and a physical layer encoding added by the physical layer. For TLPs, in version 5.0 of the PCIe protocol, the payload is of a variable length, the LCRC is 4B, and the physical layer encoding is 4B. Thus, there is a fixed overhead in the transmission of TLPs due to the addition of information added by the data link and physical layers in the PCIe protocol stack. For large TLPs with a large payload, this overhead is relatively small, but for small-payload TLPs, the overhead can be significant.

BRIEF DESCRIPTION OF THE DRAWINGS

FIG. 7 shows a table of flit characteristics for exemplary flit definitions with per-lane FEC schemes for various PCIe link widths.

FIGS. 8A-8C illustrate exemplary flit packet sequences according to various placement rules.

FIG. 9 shows a table of PCIe 5.0 TLP efficiencies.

FIG. 12 illustrates an exemplary flit definition for a x16 PCIe link utilizing a flit-level FEC scheme.

FIGS. 13A-13B illustrate exemplary flit definitions for x8 and x4 PCIe links utilizing flit-level FEC schemes.

FIGS. 15A and 15B show tables containing retry characteristics for per-lane and flit-level FEC schemes.

FIG. 19 illustrates an exemplary method of receiving a flit with a flit-level FEC scheme.

DETAILED DESCRIPTION

Figure 1:
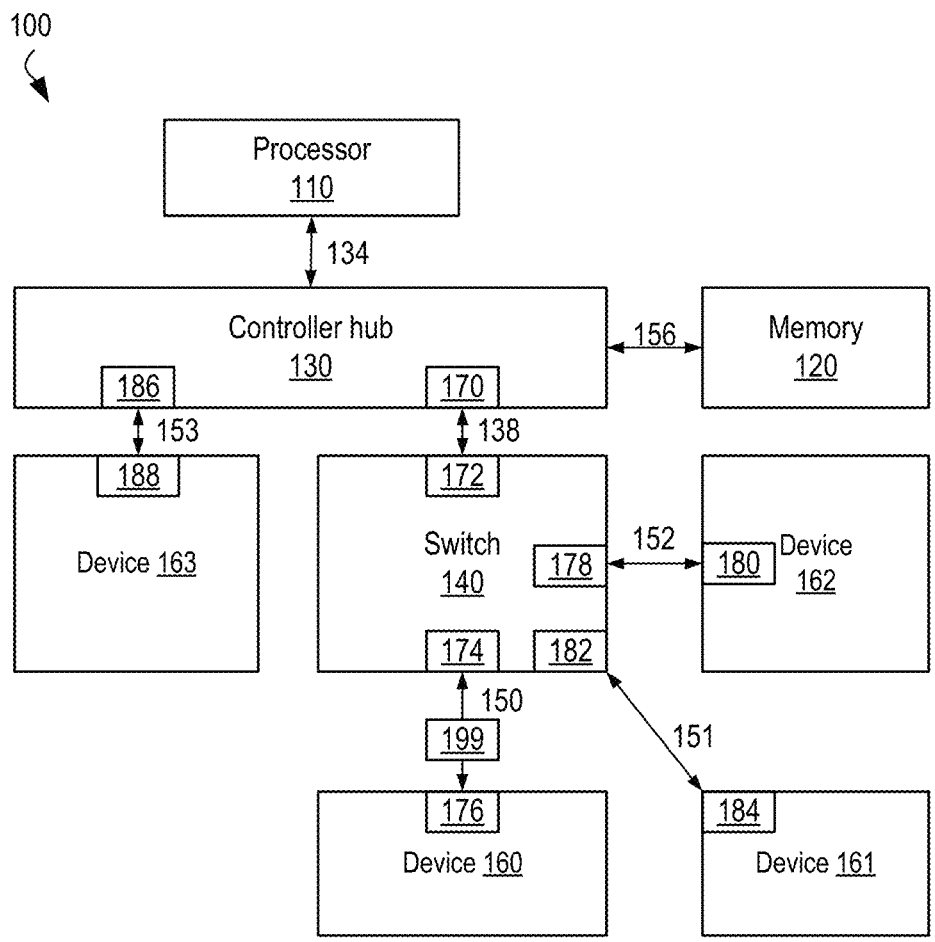
FIG. 1 illustrates an exemplary computing system comprising a set of interconnected components.

The present disclosure provides technologies that allow for increased packet transmission efficiencies between electronic components connected by PCIe links. The increased efficiencies are possible through assembly of transaction layer packet (TLP) information and data link layer packet (DLLP) information into a "flit". Flits are sent across one or more lanes of a link, and each flit is protected by a flit-level cyclic redundancy code (CRC) scheme. Flits can be further protected by either per-lane or flit-level forwarded error correction (FEC) schemes. In per-lane FEC schemes, flit information sent across each lane of a link is protected with FEC codes sent across the same lane. In flit-level FEC schemes, one set of FEC codes protect the entire flit. The flit-level CRC schemes described herein can provide TLP transmission efficiencies greater than those in current PCIe protocol versions wherein a link CRC (LCRC) is transmitted with TLPs sent across a link. For example, a 284-symbol flit may comprise eight flit-level CRC symbols to achieve a desired error detection probability against a target bit error rate, which is significantly less than the 56 LCRC symbols that would accompany the 14 TLPs transmitted across a link according to current PCIe protocol requirements. Further efficiencies arise from TLP information not having to be wrapped by physical layer encoding. With flit-based packetization, it is not necessary to wrap each TLP in a flit as TLP locations within a flit are defined by a flit format definition. Although the technologies described herein are discussed in certain embodiments with regards to the PCIe protocol, flit-based packetization can be utilized in other communication protocols.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects are being referred to. Such adjectives do not imply objects so described must be in a given sequence, either temporally or spatially, or in ranking, or in any other manner, unless expressly stated. "Connected" may indicate elements are in direct physical or electrical contact with each other and "coupled" may indicate elements co-operate or interact with each other, but they may or may not be in direct physical or electrical contact.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

Reference is now made to the drawings, wherein similar or same numbers may be used to designate same or similar parts in different figures. The use of similar or same numbers in different figures does not mean all figures including similar or same numbers constitute a single or same embodiment.

FIG. 1 illustrates an exemplary computing system comprising a set of interconnected components. System 100 includes processor 110 and memory 120 connected to controller hub 130. Processor 110, as well as any processor described herein, comprises any processing element, such as a microprocessor, a host processor, an embedded processor, a co-processor, processor core, or other processor. Processor 110 is connected to controller hub 130 by connection 134. In one embodiment, connection 134 is a serial point-to-point interconnect. In another embodiment, connection 134 includes a serial differential interconnect architecture that is compliant with different interconnect standards.

Controller hub 130 is connected to switch 140 by connection 138. Switch 140 is connected to devices 160-162 by connections 150-152. In some embodiments, connections 138, 150-152 are serial point-to-point interconnections. In some embodiments, connections 138, 150-152 are links that conform to the PCI Express (Peripheral Component Interconnect Express) standard. A PCI Express (PCIe) link is a serial point-to-point communication channel that allows ports at the ends of the link (e.g., ports 170 and 172 connected to link 138) to send and receive information. At the physical level, a PCIe link (hereinafter "link") is comprised of one or more lanes. A lane comprises two differential wire pairs, one receiving pair and one transmitting pair. Thus, one lane comprises four wires. A "x4" link has four lanes (16 wires), a "x16" link has 16 lanes (64 wires), a "x32" link has 32 lanes (128 wires), etc. Any connection between devices disclosed herein can also be referred to as a bus.

Memory 120 includes any memory device, such as random-access memory (RAM), non-volatile memory (including chalcogenide-based phase-change non-volatile memories), or other memory accessible by devices in system 100. Memory 120 is coupled to controller hub 130 through memory interface 156. Memory interface 156 can be a double-data rate (DDR) memory interface, a quad data rate (QDR) memory interface, dual-channel DDR memory interface, and a dynamic RAM (DRAM) memory interface or any other memory interface.

In one embodiment, controller hub 130 is a PCIe root complex. In other embodiments, the controller hub 130 can comprise a chipset, a platform controller hub (PCH), memory controller hub (MCH), a northbridge, an interconnect controller hub (ICH), a southbridge, or a root controller/hub. The term chipset can refer to two or more physically separate controller hubs, such as a memory controller hub (MCH) coupled to an interconnect controller hub (ICH) in a two-controller-hub chipset configuration. In some embodiments, the controller hub 130 can be part of the processor 110. In other embodiments, a portion or all the controller hub 130 functionality can be integrated into processor 110.

Input/output ports that provide communication between components shown in FIG. 1 can implement a protocol stack to provide communication between components. For example, ports 170 and 172 allow communication between controller hub 130 and switch 140 via connection 138.

Switch 140 routes messages from devices 160-162 upstream, i.e., up the interconnection hierarchy towards controller hub 130, and downstream, i.e., down the hierarchy away from the controller hub 130 to devices 160-162. As such, ports 172, 176, 180, and 184 and can be referred to as upstream ports and ports 170, 174, 178, and 182 can be referred to as downstream ports. As shown in FIG. 1, controller hub 130 does not need to communicate through a switch to communicate to downstream devices (e.g., devices 160-162). Controller hub 130 can directly connect to downstream devices, as shown by its connection to device 163 by connection 153, enabled by ports 186 and 188.

Devices 160-163 can comprise any internal or external device or component included in or coupled to a computing system, such as an I/O device, a Network Interface Controller (NIC), a graphics card, any other type of add-in card, an audio processor, a network processor, a hard-drive, a solid-state drive (SSD), a flash memory device, other storage device, a CD/DVD ROM, a monitor, a printer, a mouse, a keyboard, a router, a portable storage device, a Firewire device, a Universal Serial Bus (USB) device, a scanner, and other input/output devices.

In embodiments where connections 150-153 are PCIe links, devices 160-163 are referred to as PCIe endpoints. PCIe endpoint devices are often classified as legacy, PCIe, or root complex integrated endpoints. Further, a PCIe link can include one or more extension devices (e.g., 199), such as retimes or repeaters.

The term "device" can refer to any of the components in system 100 as well as any other device. Thus, a device can refer to a processor, controller hub, root complex, switch, endpoint, peripheral card, I/O device, etc.

Figure 2:
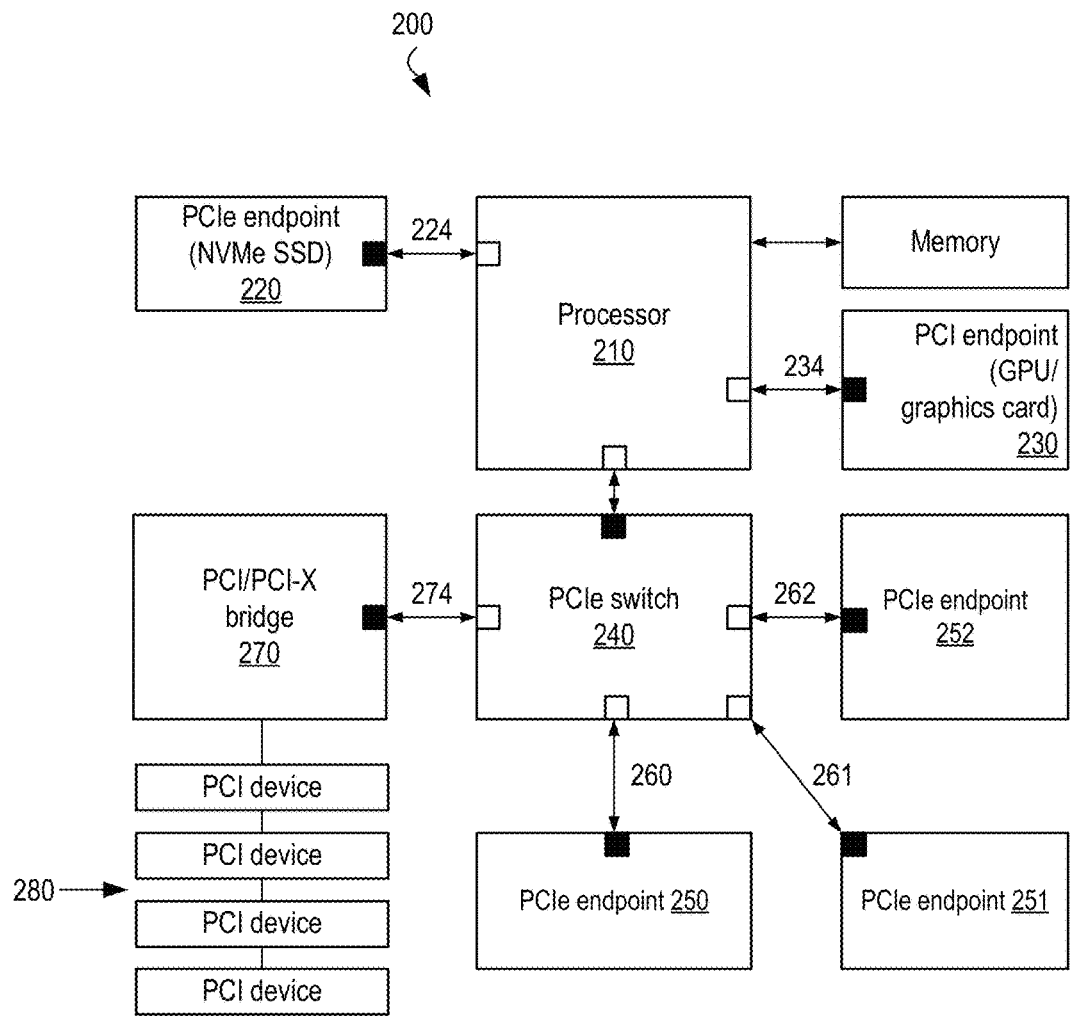
FIG. 2 illustrates an exemplary computing system comprising a set of components interconnected via PCIe links.

FIG. 2 illustrates an exemplary computing system comprising a set of components interconnected via PCIe links. System 200 comprises a processor 210 that includes PCIe root complex functionality. Processor 210 is connected to PCI endpoints 220 and 230 via links 224 and 234, respectively. PCI endpoint 220 is an NVMe (Non-Volatile Memory Express) SSD and PCIe endpoint 230 is a graphic processing unit (GPU) or a graphics card. Processor 210 is also connected to PCIe switch 240. Switch 240 is connected to PCIe endpoints 250-252 via links 260-262. Switch 240 is further connected to PCI/PCI-X bridge 270 (Peripheral Connection Interface/Peripheral Connection Extended Interface) via link 274 bridge to support PCI devices 280. Upstream and downstream PCIe ports are shown in FIG. 2 as filled and unfilled squares, respectively.

Figure 3:
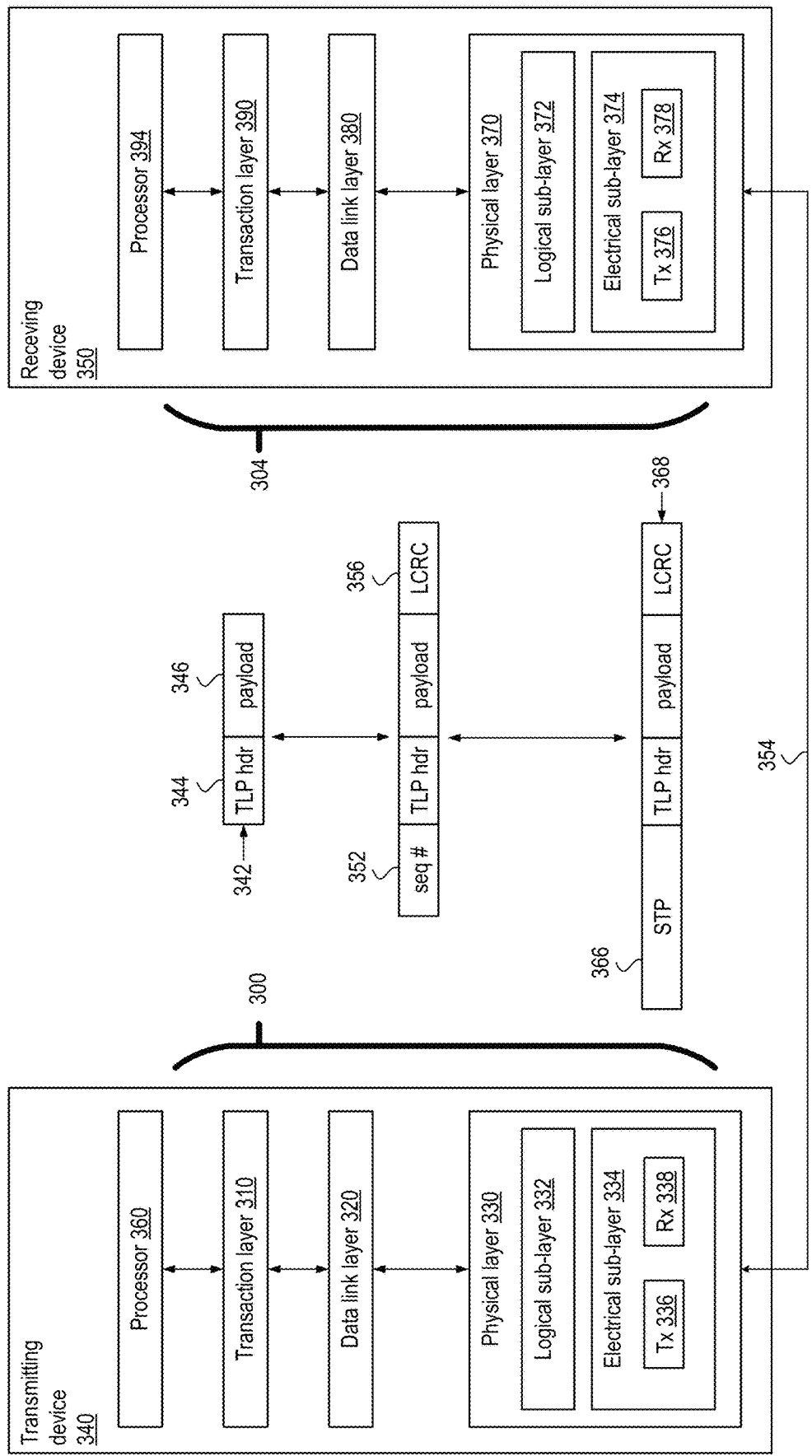
FIG. 3 illustrates an exemplary pair of protocol stacks implemented in a transmitting-receiving device pair.

FIG. 3 illustrates an exemplary pair of protocol stacks implemented in a transmitting-receiving device pair. Protocol stacks 300 and 304 can be any kind of protocol or network stack, such as a PCIe stack. Although references are made herein to a PCIe stack, the same concepts may be applied to other protocol or network stacks. In one embodiment, protocol stack 300 is a PCIe protocol stack comprising transaction layer 310, data link layer 320, and physical layer 330. A communication port, such as ports 170, 172, 174, 176, 178, 180, 182, 184, 186, 188 in FIG. 1, may be referred to as a module, circuitry, interface, or port implementing or including protocol stack 300 or any other protocol stack. Thus, in one embodiment, a protocol stack can comprise a transaction layer module, a data link layer module, and a physical layer module. Such a protocol stack can also be considered as comprising transaction layer circuitry, data link layer circuitry, and physical layer circuitry. When referencing the protocol stack as a whole, a protocol stack can be referred to as protocol stack circuitry or a protocol stack module.

PCI Express uses packets to communicate information between a root complex, switches, and endpoints. For example, information to be sent from transmitting device 340 to receiving device 350 is sent from processor 360 (or any other processing device of transmitting device 340) to protocol stack 300. Transaction layer 310 packets carry the information to be delivered from processor 360 of transmitting device 340 to processor 394 of receiving device 350. As the packets that are formed at transaction layer 310 move down the protocol stack to data link layer 320 and then to physical layer 330, they are extended with information to handle packets at those layers. Physical layer 330 of transmitting device 340 transmits packets over link 354 to physical layer 370 of receiving device 350. There, the reverse process occurs, and the information added to the packets as they moved down protocol stack 300 is stripped as the packets move up protocol stack 304. Transaction layer 390 of protocol stack 374 delivers the payload of the packets sent from transmitting device 340 to processor 394 of receiving device 350, thus resulting a message being sent from transmitting device 340 to receiving device 350.

In one embodiment, transaction layer 310 provides an interface for processor 360 to PCIe protocol stock 300. Transaction layer 310 is responsible for the assembly and disassembly of transaction layer packets (TLPs) that deliver information between devices. Upon receipt of information from processor 360, transaction layer 310 assembles one or more TLP packets that will deliver the information to receiving device 350. TLP packet 342 is one embodiment of a TLP packet. TLP packet 342 comprises TLP header 344 and payload 346. Additional information can be included in a TLP packet, such as an end-to-end cyclic redundancy code (ECRC), an error-detection code that a PCIe transaction layer can calculate for a TLP packet.

Data link layer 320 acts as an intermediate stage between transaction layer 310 and physical layer 330. In one embodiment, one responsibility of data link layer 320 is to provide a reliable mechanism for exchanging Transaction Layer Packets (TLPs) between devices across a link. In one embodiment, the reliability mechanism is implemented in part by determining a packet sequence number for a TLP packet and calculating a link CRC (LCRC) value based on the contents of the TLP packet and the packet's sequence number. Data link layer 320 appends information 352 to the head of TLP packet 342 that includes the packet sequence number and appends LCRC value 356 to the tail of TLP packet 342. Data link layer 320 submits TLP 342 with appended information to physical layer 330 for transmission across link 354 to receiving device 350.

In some embodiments, data link layer 320 comprises a replay buffer that stores copies of transmitted flits until transmitting device 340 receives an acknowledgment, implicitly or explicitly, that the transmitted flits have been transmitted successfully. Transmitting device 340 can receive an ACK (acknowledgment) signal from receiving device 350 that a transmitted flit has been successfully received and can receive a NAK (no acknowledgment) signal from receiving device 350 if a transmitted flit has not been successfully received. Receiving device 350 can determine that a flit has not been successively received by, for example, not receiving an expected flit within a pre-determined or other specified time or by determining that a received flit is corrupt. Receiving device 350 can determine that a received flit is corrupted by, for example, the flit failing a flit-level CRC check, a per-lane FEC check, or a flit-level FEC check.

In response to determining that a flit has not successfully received, receiving device 350 can send a retry request to transmitting device 340. The retry request can include information identifying which flits are to be retransmitted. Such flits may be referred to herein as "retry flits". The retry request can identify one or more individual flits to be retransmitted, that all flits starting from an identified flit are to be retransmitted or identify the flits to be retransmitted in any other matter. In response to receiving a retry request, transmitting device 340 retransmits the retry flits identified by the retry request. In some embodiments, transmitting device 340 retrieves the retry flits from the replay buffer. In other embodiments, transmitting device 340 can determine that a retry flit was a null flit (a flit that does not contain any transaction layer packet information, as discussed in further detail below) and reconstruct the null flit if the null flit was not stored in the replay buffer prior to transmission.

In some embodiments, transmitting device 350 can determine that a transmitted flit is a null flit and not store the null flit in the replay buffer prior to transmission. In some embodiments, transmitting device 340 can keep track of whether transmitted flits are null flits. In other embodiments, transmitting device 340 can determine that a retry flit is a null flit by determining the presence of a non-contiguous flit sequence in the replay buffer that corresponds to the retry flits. A non-contiguous flit sequence can be determined from flit sequence numbers or other flit identifiers. For example, if transmitting device 340 transmits five flits with sequence numbers 1 through 5, and flit 3 is a null flit, transmitting device 340 may only store flits 1, 2, 4, and 5 in the replay buffer. If transmitting device 340 then receives a retry request requesting retransmission of flits 2 through 5, during retrieval of the retry flits from the replay buffer, transmitting device 340 can determine the presence of non-contiguous flits stored in the replay buffer (i.e., transmitting device 340 detects that the flit sequence numbers for flits stored in the replay buffer jump from 2 to 4), retrieve flits 2, 4, and 5 from the replay buffer, reconstruct flit 3 as a null flit, and retransmit flits 2 through 5 (including reconstructed flit 3) to receiving device 350. Thus, transmitting device 340 can reconstruct flits corresponding to gaps in the non-contiguous flit sequence as null flits and send the reconstructed null flits as part of the retry flits to receiving device 350. As discussed in greater detail below, a receiving device may not send a request retry for null flits. For debug and test purposes, a receiver can have a mode that allows for the retry of null flits.

Moving down the protocol stack 300 of transmitting device 340, in one embodiment, physical layer 330 includes logical sub-layer 332 and electrical sub-layer 334 to physically transmit a packet to an external device. Here, logical sub-layer 332 is responsible for the "digital" functions of physical layer 330. In this regard, the logical sub-layer includes a transmit section to prepare outgoing information for transmission by physical sub-layer 334, and a receive section to identify and prepare received information before passing it to data link layer 320. Logical sub-layer 332 frames the appended TLP packet with start transaction packet (STP) field 366 to generate an as-transmitted TLP 368 that is transmitted across link 354. The STP field 366 comprises sequence number 352, frame CRC bits, the length of the TLP, and other information.

As used herein, the term "transaction layer packet" refers to TLPs generated by transaction layer 310 and comprises TLP header and payload information. The terms "transaction layer packet information" and "transaction layer packet data" can refer to either the TLP header, the TLP payload, or both. As used herein, the term "transaction layer packet" does not include information added to a TLP, such as sequence number, LCRC, or framing data added by the data link and physical layers, unless expressly stated. Similarly, the term "data link layer packet" refers to data link layer packets that do not contain framing data added by a physical layer, unless expressly stated.

Electrical sub-layer 334 includes transmitter 336 and receiver 338. Transmitter 336 is supplied symbols by logical sub-layer 332, which transmitter 336 serializes and transmits to receiving device 350 across link 354. Receiver 338 is supplied with received serialized symbols sent across link 354 by receiving device 350 and transforms the received signals into a bitstream. The bitstream is deserialized and supplied to logical sub-layer 332. In one embodiment, packets are transmitted across link 354 using an 8b/10b data encoding scheme, wherein eight bits of data are transmitted as ten-bit symbols.

Although transaction layer 310, data link layer 320, and physical layer 330 are discussed in reference to an embodiment of a PCIe protocol stack, a protocol stack is not so limited. In other embodiments, protocol stack 300 can have different layers and/or fewer or more layers than those shown. Further, in other embodiments, the separate layers shown in FIG. 3 can be combined into a single layer, and a single layer as shown in FIG. 3 can be split into multiple layers. Any of the layers in the protocol stack shown in FIG. 3 can be implemented as part of the operating system of a computing device, one or more software applications independent of the operating system, or operate at another software layer. The layers shown in FIG. 3 can be implemented in software, hardware, firmware or combinations thereof and can be alternately referred to as modules or circuitry (e.g., "data link layer module," "physical layer circuitry") or a combination thereof. A computer device referred to as being programmed to perform a method can be programmed to perform the method via software, hardware, firmware or combinations thereof.

Figure 4:
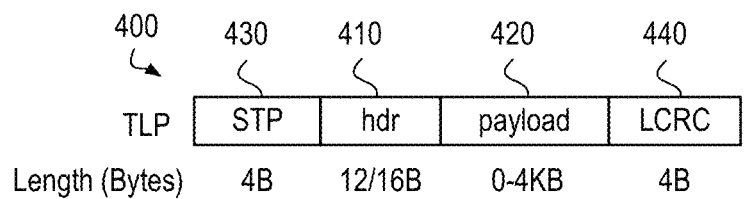
FIG. 4 illustrates an exemplary format of a PCIe TLP as transmitted across a link.

FIG. 4 illustrates an exemplary format of a PCIe TLP as transmitted across a link. TLP 400 comprises TLP header 410 and TLP payload 420, LCRC 440, and STP 430. In one embodiment, TLP header 410 can be 16 or 20 bytes (16/20B), TLP payload 420 can be 0-4,096 bytes (0-4 KB), STP 430 is four bytes (4B), and LCRC 440 is four bytes (4B).

For the TLP packet format shown in FIG. 4, the overhead per TLP comprises 8B, or 2 double words (2DW), where one double word is four bytes (1DW=4B). Because the TLP packet format allows for payloads of varying widths, the TLP transmission efficiency is also variable. For TLPs carrying a large payload, the overhead is relatively small, and the efficiency is high, but for TLP packets carrying little or no payload, the overhead can be expensive. For example, a TLP with a 4DW header and carrying no payload is 6DW in length, yielding a transmission efficiency of 67% (or, data link layer and physical layer encoding overhead of 33%).

The data link layer packet (DLLP) is a second PCI Express packet type. In current versions of the PCIe protocol, a DLLP can be 8 bytes (8B), as transmitted along a link. A DLLP packet can be, for example, an ACK packet, which acknowledges that a transmitted TLP has been successfully received, a NAK packet, which indicates that a TLP arrived corrupted at the receiver (or did not arrive at all), and flow control DLLPs that are used as part of the data link layer's credit-based flow control mechanism. A third packet type is the idle packet (IDL), which is one DW in length and is transmitted on an active link when no message is to be sent. In addition to transmission inefficiencies due to link CRC and physical layer encoding overhead, other transmission inefficiencies can exist. For example, periodic DLLP updates can consume link bandwidth. In some PCI Express embodiments, periodic DLLP updates can consume 2-5% of link bandwidth. Further details of PCIe packet formats in various PCIe protocol version can be found at the PCI-SIG website.

In some embodiments, additional error correction beyond LCRCs and ECRCs may be employed to achieve a desired bit error rate (BER). For example, forward error correction (FEC) may be applied on a per-lane basis to achieve a desired BER in protocol stacks comprising various techniques for achieving high-speed digital links, such as PAM-4 (pulse amplitude modulation) multi-level signaling or other techniques for achieving high-speed digital links. PAM-4 signaling with FEC may be used to achieve an acceptable range of BER while running at 64 GT/s, the planned speed for version 6.0 of the PCIe protocol. In a per-lane FEC scheme, n bits of data transmitted on a lane has k bits of information and (n-k) error correction code bits. Per-lane FEC schemes help with lane-to-lane correlation of errors as errors on each lane are corrected independently. Accordingly, n bits are to be received and checked before a TLP can be passed to the data link layer and verified using the TLP's LCRC codes. The inclusion of FEC at the lane level consumes additional link band width due to the inclusion of the k FEC check bits. Additional latency arises from the store-and-forward latency resulting from the implementation of FEC at the receiver.

Figure 5:
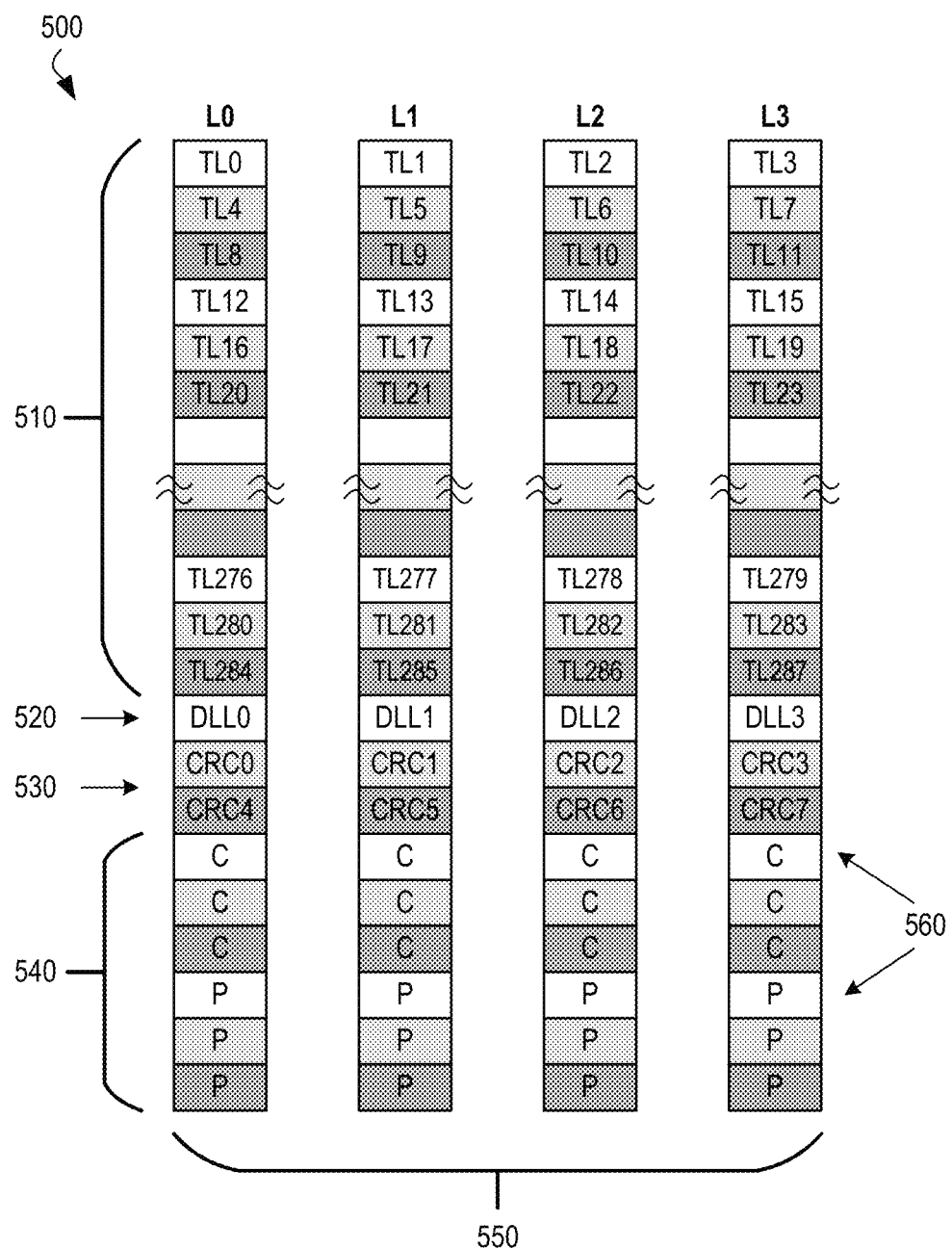
FIG. 5 illustrates an exemplary flit definition with a per-lane FEC scheme for a x4 PCIe link.

FIG. 5 illustrates an exemplary flit definition with a per-lane FEC scheme for a x4 PCIe link. A flit comprises one or more TLPs and DLLPs protected by a flit-level CRC scheme and a per-lane FEC scheme. In some embodiments, a flit may be protected by a flit-level FEC scheme, as will discussed in greater detail below. Flit 500 comprises transaction layer packet symbols 510, data link layer packet symbols 520, flit-level CRC code symbols 530, and FEC symbols 540. Flit 500 comprises 324 total symbols. In some embodiments, a symbol can be 1DW in length, but a symbol can be different lengths in other embodiments. The 324 symbols in flit 500 comprise 288 symbols carrying transaction layer packet information (TL0-TL287), 4 symbols carrying data link layer packet information (DLL0-3), 8 flit-level CRC symbols (CRC0-7), and 24 FEC symbols (12 check symbols (C) and 12 parity symbols (P)). Eight CRC symbols are used to ensure that multiple TL/DPP symbol errors are covered adequately. Information from a single TLP can span multiple TL symbols in a flit. For example, if a symbol is 1DW long, flit 550 would need 8 TL symbols to store a TLP that is 8DWs in length.

Flit 500 is transmitted across lanes 550 (L0-L3). That is, a different portion of flit 500 is sent across each of the four lanes. FIG. 5 shows successive TL, DLL, and CRC symbols being transmitted along adjacent lanes, but in other embodiments, symbols could be apportioned among lanes in differing fashions.

Flit 500 can have a flit sequence number, which may be specified explicitly, implicitly, or opportunistically. If specified explicitly, the flit sequence number can be coded, for example, in reserved bits in the flit. If specified implicitly, the flit sequence number may not be sent across the link and a receiver can determine the flit packet number in another fashion, such as, for example, by counting flits as they are received. If specified opportunistically, the flit sequence number can be sent, for example, as payload in a DLLP packet that is sent in full or in part as part of a flit. In one example of flit sequence numbers being sent implicitly, the CRC can include the flit sequence number as, for example, consecutive bits in the CRC code during CRC computation. Accordingly, any dropped or replayed flits could be detected at a receiving end.

In flit 500, four one-byte symbols (DLL0-3) are allocated for one DLLP. In other embodiments, information from multiple DLLPs can be carried in a single flit. In still other embodiments, a DLLP can be constructed over consecutive flits. For example, in a flit format that allocates five DLLP bytes, four DLLP bytes can carry one DLLP and the fifth DLLP byte from four consecutive flits can contribute to an additional DLLP.

The flit-level CRC code protects the flit contents minus the FEC check and parity symbols. For example, the flit-level CRC codes in symbols CRC0-7 in flit 500 protect the TL, DLL and CRC symbols in flit 500. The per-lane FEC scheme protects all symbols within a flit that are transmitted across one lane. For example, the six FEC check and parity symbols to be transmitted along one of the lanes L0-L3 protect the 81 symbols (324 flit symbols/4 lanes) transmitted along that lane. The FEC scheme further employs interleaving. The FEC scheme employed in flit 500 uses three-way interleaving, as represented by the shading of each symbol. For example, check and parity symbols 560, shown with no shading, protect the symbols transmitted along lane L3 that are also shown with no shading (TL3, TL7, TL11 . . . TL287, CRC3, CRC7, check/parity symbols 560). Thus, in the FEC scheme illustrated in FIG. 5, two FEC symbols—one check symbol and one parity symbol—are used to protect 27 flit symbols (81 symbols transmitted along lane L3/3-way interleaving). In other embodiments, alternative interleaving schemes (2-way, 4-way, etc.), as FEC schemes with more of fewer check and parity bits per lane can be used to achieve a desirable bit error rate.

Figure 6:
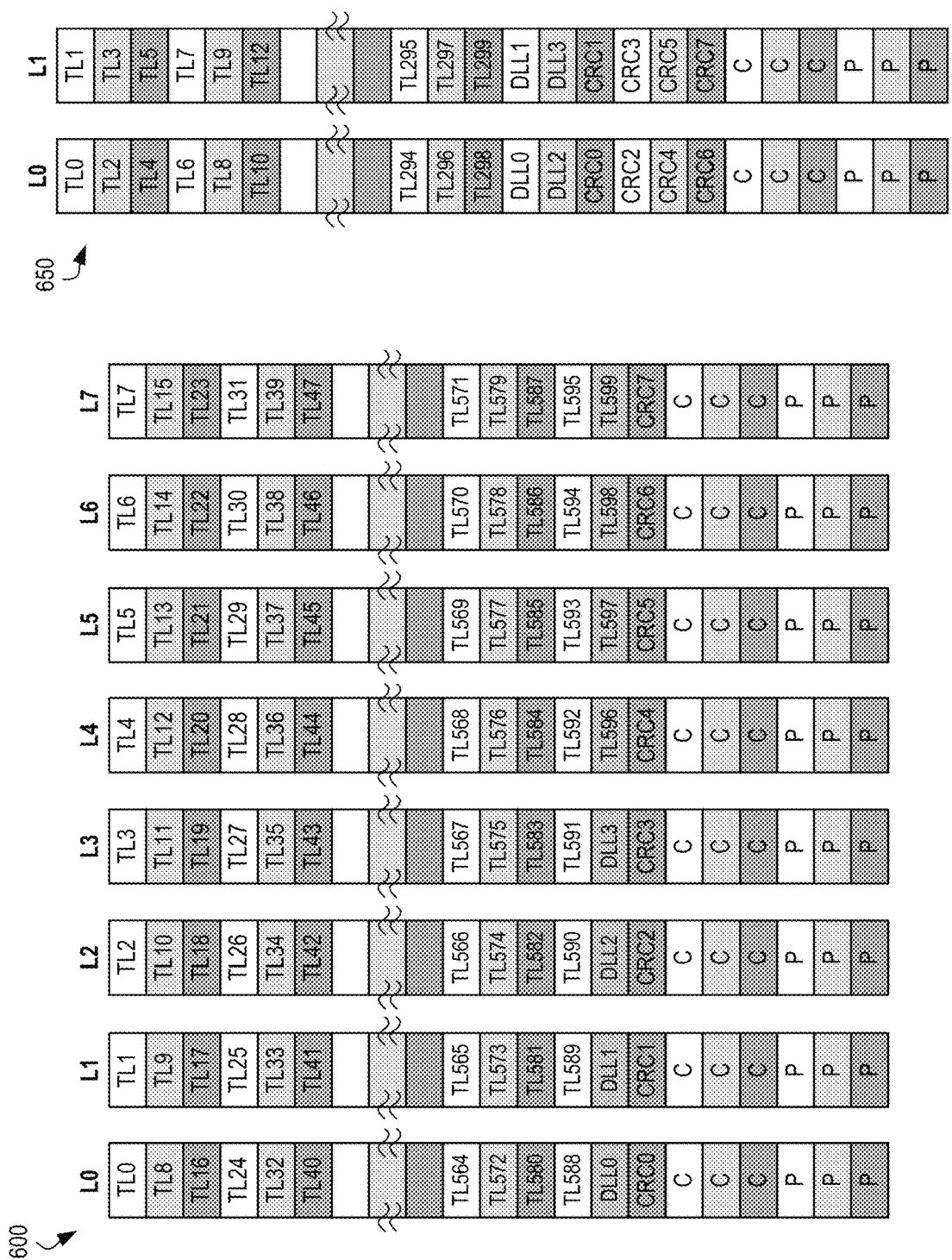
FIG. 6 illustrates exemplary flit definitions with a per-lane FEC scheme for x8 and x2 PCIe links.

Different flit definitions can be used for different link widths. FIG. 6 illustrates exemplary flit definitions with per-lane FEC schemes for x8 and x2 PCIe links. Flit 600 defines a 648-symbol flit format for a PCIe x8 link. Flit 600 comprises 600 symbols containing transaction layer packet data (TL0-TL599), 4 symbols containing data link layer packet data (DLL0-3), 8 flit-level CRC symbols (CRC0-7), and 48 FEC symbols (24 check symbols and 24 parity symbols). The 648 symbols are transmitted across eight lanes (L0-L7). As in flit 500, the six FEC check and parity symbols transmitted in a lane protect 81 symbols (648 symbols/8 lanes) using 3-way interleaving, with each pair of FEC check and parity symbols protecting 27 symbols (81 symbols/3-way interleaving).

Flit 650 is a 324-symbol flit definition for a PCIe x2 link. Flit 650 comprises 300 symbols carrying transaction layer packet information (TL0-TL299), 4 symbols carrying data link layer packet information (DLL0-3), eight CRC symbols (CRC0-7), and 12 FEC symbols (6 check symbols and 6 parity symbols). The 324 symbols are transmitted across two lanes (L0-L1). The six FEC check and parity symbols transmitted in each lane protect 162 symbols (324 symbols/2 lanes) using three-way interleaving, with each pair of FEC check and parity symbols protecting 54 symbols (162 symbols/3-way interleaving).

Flits 500, 600 and 650 show exemplary flit definitions for particular PCIe link widths. Other flit definitions are possible for a particular PCIe link. The number of TL and/or DLL symbols can vary from one flit definition to another, as can the number flit-level CRC symbols used to protect a flit, the number of FEC symbols used to protect a lane, and the degree of interleaving used for the FEC scheme. Increasing the number of flit-level CRC symbols and/or the FEC symbols used can reduce BER, but at the cost of increased overhead, and thus, efficiency.

In some embodiments, the flit definition for a particular link can be defined, determined, or supplied by an operating system or BIOS during system start-up. The flit definition for a link can be stored in software or firmware local to the system, be encoded in hardware, or stored remotely and accessed during system start-up. The flit definition for a particular link need not be static and can vary during system operation. For example, the physical layer, protocol stack, or operating system can receive an updated flit definition for a particular link and the link can begin using the updated flit definition at some point after receiving the updated flit definition. An updated flit definition can be provided in response to various events. For example, a physical layer can monitor link performance and signal to the protocol stack or operating system that the BER of the link is too high, and the system can switch to a flit definition that has a flit-level CRC scheme with more CRC bytes, a per-lane FEC scheme that has more check and parity bits per lane, a flit-level FEC scheme that has more check and parity bits per flit, or a combination thereof. In another example, the system can determine that greater information throughput is possible while keeping the BER at an acceptable level and a flit definition providing greater transmission efficiency can be used. Greater efficiency can be obtained in an updated flit definition by increasing the number of TLP/DLLP packet symbols in the flit, or by reducing the number of flit-level CRC symbols and/or the number of FEC check/parity symbols.

Referring to FIG. 3, in some embodiments, a protocol stack implementing flit-based packetization can have the same configuration as protocol stack 300. That is, a protocol stack implementing flit-based packetization can comprise a transaction layer, a data link layer, and a physical layer. The transaction layer can generate TLPs based on information received from a processing core and pass the TLPs to a data link layer that places TLP and DLLP information into a flit and calculates flit-level CRC codes for placement in the flit. As discussed below, TLP and DLLP information may be placed in a flit based on placement or packing rules. A filled flit does not mean that every symbol reserved for TLP or DLLP information has TLP/DLLP header or payload information in it. A filled flit can contain NULL TLPs or IDL symbols if fields reserved for transaction layer packet information. A physical layer can calculate FEC check and parity symbols for flit symbols to be transmitted across a lane, add the FEC symbols to the flit, and send the completed flit across the link.

In other embodiments, flit assembly and disassembly tasks can be apportioned differently to the data link layer and physical layers. For example, the physical layer can calculate the flit-level CRCs along with the per-lane FECs. In another embodiment, the data link layer and physical layers can be combined, and flit assembly and disassembly tasks are performed by a single layer. Other arrangements are possible.

FIG. 7 shows a table of flit characteristics for exemplary flit definitions with per-lane FEC schemes for various PCIe link widths. Table 700 shows flit characteristics for flits 500, 600, and 650 for x4, x8 and x2 links, respectively, and flit characteristics for possible flit definitions for x1 and x16 links. The FEC latencies shown are approximate latency times at transfer speeds proposed for PCIe Gen 6. The narrower links (x1, x2) have higher FEC latency to derive improved efficiency by amortizing the fixed overhead (flit-level CRC symbols and data link layer packet information)

as shown. Flit definitions having characteristics different than those shown in Table 1 can be used for varying link widths. Different flit sizes for a given link width can be selected to trade-off latency for efficiency.

Flit-based packetization can provide at least the following advantages. First, flit-based packetization removes the need for an LCRC to be attached to each TLP since the flit is protected by a CRC scheme at the flit level. Flit 500 in FIG. 5 comprises TLP data from 288 TLPs and only eight flit-level CRC symbols. If sent across a link using current PCIe protocols, those 288 TLPs would be accompanied by 288 LCRCs. In other words, a flit does not contain a CRC sent along with each TLP included in the flit. With flit-based packetization, link layer retry happens at the flit level. In one embodiment, a failed flit can be retried with a receiver storing successfully transmitted flits received at the receiver after the corrupted or missing flit. In some embodiments, a transmitter can be informed that a transmitted flit was not successfully received through receipt of a NAK DLLP containing the sequence number of the flit to be resent. In some embodiments, a retried flit can indicate that it is being resent via a "retry flit" encoding in the corresponding DLLP along with the sequence number of the retried flit.

Second, flit-based packetization allows for the adoption of guaranteed DLLP frequency policies. In one embodiment, upon transmission of a flit, the transmitter is to receive a DLLP acknowledgment packet indicating that the flit was received no later than n flits after being sent. In another embodiment, a receiver is to send a DLLP packet providing credit updates to the transmitter no later than m flits after accruing x number of credits. Such policies can reduce storage overhead at the receiver relative to current receiver storage needs, which account for current PCIe DLLP scheduling policies and having to handle such situations as sending an ACK or NAK DLLP behind a maximum payload size TLP.

Third, since flit definitions provide guaranteed positions for DLLPs in a flit, the 2-5% variable bandwidth loss due to DLLP scheduling is exchanged for a fixed bandwidth reduction for a given flit definition. For example, in the x4 flit definition of flit 500, the bandwidth reduction due to DLLP overhead is only 1.2% (1/81).

Fourth, the bandwidth loss due to the addition of framing information added by the physical layer (i.e., start frame 366 in FIG. 3) to each TLP is eliminated since transaction layer packet information is in fixed locations in the flit and flit boundaries are known. That is, physical layer framing information is not added to a TLP for every TLP transmitted as part of a flit.

Fifth, because a particular flit format has a defined length, the synchronization header that is periodically sent in current PCIe protocols can be replaced by a periodic ordered set (OS), such as an SKP OS (Skip Ordered Set), EIOS (Electrical Idle Ordered Set), or EIEOS (Electrical Idle Exit Ordered Set). In one embodiment, a periodic OS can be sent every 72 flits for flits that are 10.25 ns long where there is a 600-ppm clock spread. Replacing the synchronization header with a periodic OS can reclaim at least a portion of the bandwidth consumed through use of a synchronization header. In current PCIe protocol formats, synchronization headers consume approximately 1.5% of bandwidth.

Figures 8A, 8B, 8C:
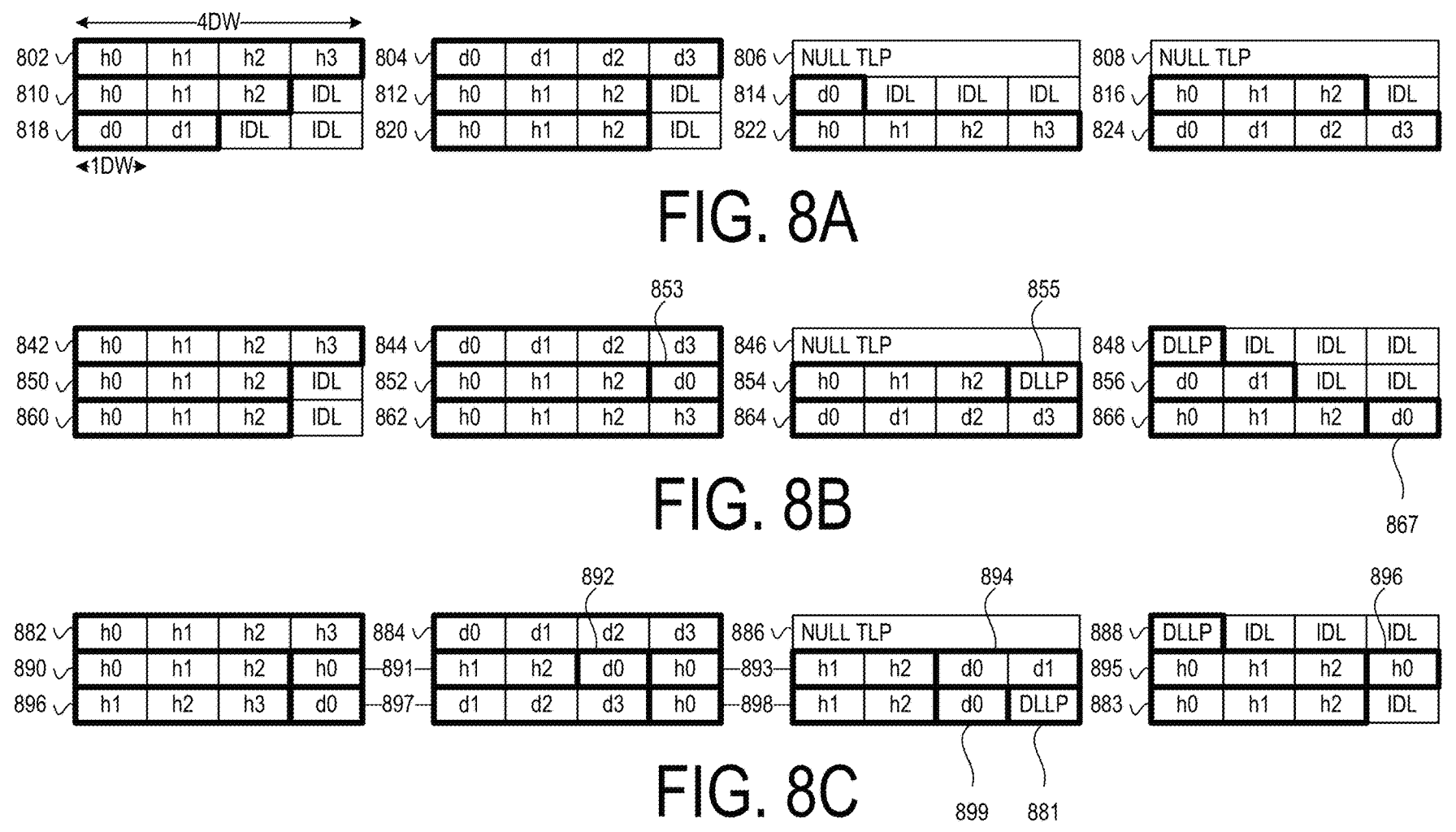

FIGS. 8A-8C illustrate exemplary flit packet sequences according to various placement rules. A flit definition defines which slots or fields in the flit may be occupied by TLP or DLLP information, but, in some embodiments, placement or packing rules are used to determine where TLP or DLLP information for individual TLPs/DLLPs to be sent in a flit are placed. FIGS. 8A-8C show a sequence of 48 flit packets transmitted across a link. The packets are sent in order from left to right in each row, with the first row being sent first and the third row being sent last. Each column is 1DW wide and each set of four columns is 4DW wide.

FIG. 8A illustrates TLPs placed in a flit according to the rule that only TLP header information or TLP payload (data) information can reside in each aligned 4DW set. Starting with the upper left-most packet, the first two 4DW sets contain header information 802 (h0-h3) and payload information 804 (d0-d3) of a first TLP. The next two 4DW sets contain NULL TLPs 806 and 808. The first 4DW set in the second row contains header information 810 (h0-h2) for a second header-only TLP. Because the header of this second TLP is only 3DWs wide, the fourth DW set is filled with an IDL packet. Idle packets can be used to fill in 4DW sets where the header or payload information for a packet is less than four DWs in length. Continuing along the second row, the second and third 4DW sets contain header information 812 (h0-h2) and payload information 814 (d0) for a third TLP. Because the header and payload information for this third TLP is less than 4DWs, the second and third 4DW sets are filled with IDL packets. The fourth 4DW set in the second row is filled with header information 816 (h0-h2) for a fourth TLP, and an idle packet. The payload 818 (d0-d1) for the fourth TLP is placed in the first two DWs of the third row, followed by two idle packets. The remaining three 4DW sets in the third row comprise header information 820 (h0-h2) for a fifth TLP, and header information 822 (h0-h3) and payload information 824 (d0-d3) for a sixth TLP. In sum, six TLPs are packed into the 48 DWs illustrated in FIG. 8A.

FIG. 8B illustrates TLPs and DLLPs placed in a flit according to the rule that each aligned 4DW set can contain header and data information from one TLP, with DLLPs placed opportunistically. Starting with the upper left-most packet of FIG. 8B, the first two 4DW sets contain header information 842 (h0-h3) and payload information 844 (d0-d3) of a first TLP. The third 4DW set contains NULL TLP 846 and the fourth 4DW set contains a first DLLP 848 followed by three IDL packets. Moving to the second row, the first 4DW set contains header information 850 (h0-h2) for a second TLP, followed by an IDL packet. The second DW contains header information 852 (h0-h2) and payload information 853 (d0) for a third TLP. The first three DWs in the third 4DW set in the second row is filled with header information 854 (h0-h2) for a fourth TLP and an opportunistically placed second DLLP 855. The fourth DW set in the second row contains payload information 856 (d0-d1) for the fourth TLP, with the last two DWs containing idle packets. Continuing to the last row, the first 4DW set contains header information 860 (h0-h2) for a fifth TLP and an idle packet. The second and third 4DW sets contain header information 862 (h0-h3) and payload information 864 (d0-d3) for a sixth TLP. The last 4DW set comprises header information 866 (h0-h2) and payload information 867 (d0) for a seventh TLP. The first six TLPs placed in FIG. 8B are the same TLPs placed in FIG. 8A. The looser packing rules associated with FIG. 8B allow for a seventh TLP and two DLLPs to be additionally placed in the same 48 DWs.

FIG. 8C illustrates TLPs and DLLPs placed in a flit according to the rule that TLP header and payload information can be placed at any DW boundary, with opportunistic DLLP placement. Placing the same 7 TLPs and 2 DLLPs that were placed in FIG. 8B, the first TLP and the first DLLP are placed in the first row of FIG. 8C in the same manner as they were in FIG. 8B. Moving to the second row, the first 4DW set contains information from the second and third TLPs: header 890 (h0-h2) from the second TLP and the first DW (h0) of header information 891 (h0-h2) of the third TLP. The remaining header information (h1-h2) of the third TLP is placed in the first two DWs of the second 4DW set. Header information 893 (h0-h2) for a fourth DLP is contained in the last DW of the second 4DW set and the first two DWs of the third 4DW set. The payload information 894 (d0-d1) of the fourth TLP is placed in the second half of the third 4DW set. The last 4DW set of the second row contains header information 895 (h0-h2) of the fifth TLP. The header information 896 (h0-h3) of the sixth DLP fills the last DW of the second row and continues into the first three DWs of the first 4DW set of the third row. The payload information 897 (d0-d3) of the sixth TLP fills the last DW of the first 4DW set in the third row and the first three DWs of the second 4DW set. The remainder of the last row is filled with the header information 898 (h0-h2) and payload information 899 (d0) of the seventh TLP, a second DLLP 881 and header information 883 (h0-h2) of an eighth TLP. Allowing TLP header and payload data to be placed in any DW allows for the seven TLPs and 2 DLLPs placed in FIG. 8B to be placed more compactly—they fit in five fewer DWs and allow for placement of an eighth TLP.

FIG. 9 shows a table of PCIe 5.0 TLP efficiencies. Table 900 shows how TLP efficiency under the most current version of the PCIe protocol (version 5.0, released May 29, 2019) varies with transaction size, yielding efficiencies above 90% for large payloads but dropping down to 62.7% for header-only transactions. These efficiencies are the same regardless of link width. Table 700 in FIG. 7 shows flit-based packetization achieving TLP efficiencies ranging from 88.9%-94.4% across link widths, a relatively uniform efficiency as compared to the range of TLP efficiencies in PCIe 5.0 across transaction sizes.

Figure 10:
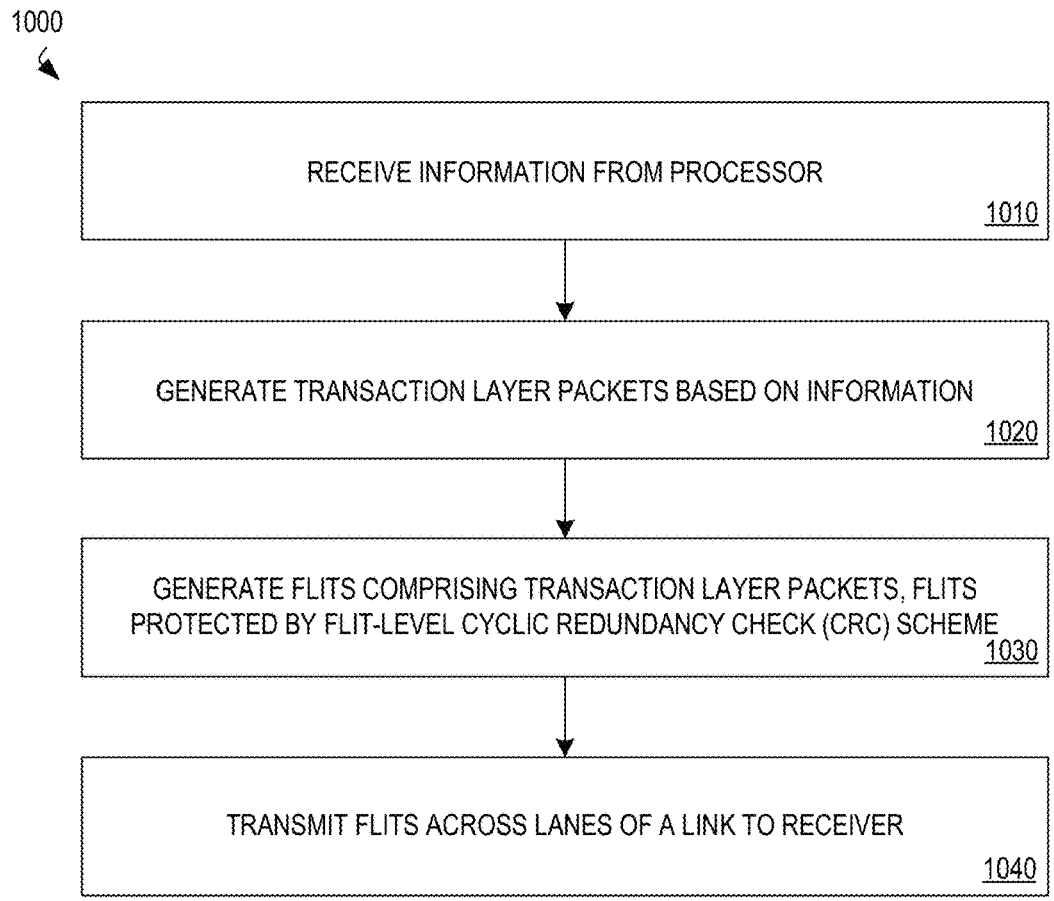
FIG. 10 illustrates an exemplary method of transmitting a flit.

FIG. 10 illustrates an exemplary method of transmitting a flit. The method 1000 can be performed by, for example, a PCIe root complex connected to a graphics card via a x4 PCIe link. At 1010, information is received from a processor. In the example, the root complex PCIe protocol stack receives a message to be sent to the graphics card from a root complex processor. At 1020, transaction layer packets are generated based on the received information. In the example, the root complex PCIe protocol stack generates TLPs based on the message to be sent to the graphics card. At 1030, flits comprising the TLPs are generated. The flits comprise the transaction layer packets and are each protected by a flit-level cyclic redundancy check (CRC) scheme. In the example, the root complex PCIe protocol stack generates one or more 324-symbol flits containing the TLPs to be sent to the graphics card. The protocol stack protects each flit with eight flit-level CRC codes based on the contents of TLP. At 1040, the flits are transmitted across the lanes of a link to a receiver. In the example, the root complex transmits the flit across the four lanes of the x4 PCIe link to the graphics card. The 324-symbol flit is broken into four streams of 81 symbols and each stream is transmitted along one of the lanes of the x4 PCIe link.

Method 1000 can optionally include additional actions. For example, the flit-level CRC codes can be transmitted across the one or lanes. In the example, the root complex transmits the eight flit-level CRC codes across the four lanes, two per lane. In another example, each flit is protected with a forward error correction (FEC) scheme applied on a per-lane basis. In the example, the root complex PCIe protocol stack determines which symbols of the 324-symbol flits will be transmitted across each lane, calculates FEC check and parity codes based on the symbols to be transmitted along each lane, and transmits the generated FEC codes across the appropriate lane.

Figure 11:
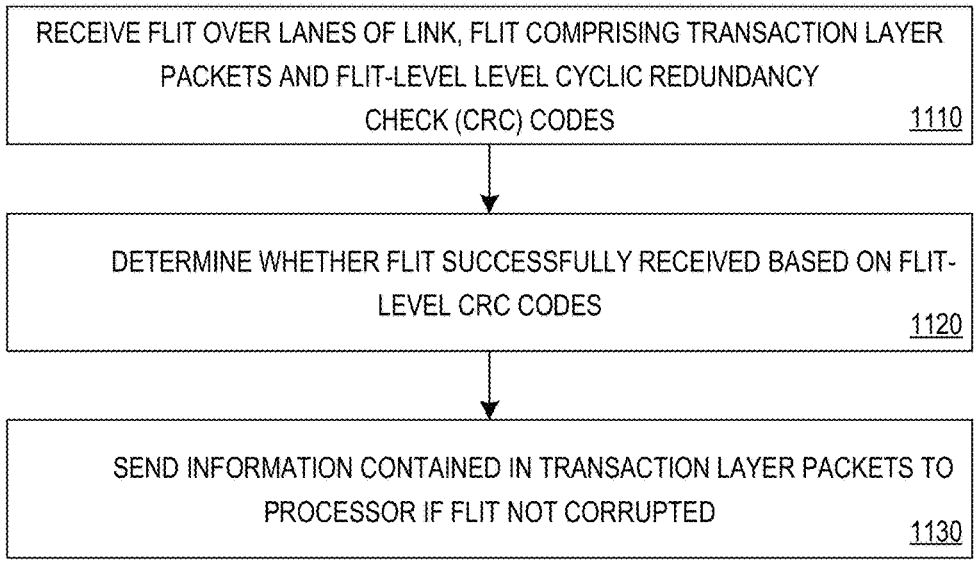
FIG. 11 illustrates an exemplary method of receiving a flit.

FIG. 11 illustrates an exemplary method of receiving a flit. The method 1100 can be performed by, for example, a network interface card (NIC). At 1110 flits are received over the lanes of a link. The flits comprise transaction layer packets and flit-level CRC codes. In the example, the NIC receives a 648-symbol flit comprising 300 TLPs over a x8 PCIe link from a root complex. At 1120, it is determined whether the flit has been successively received based on the TLPs and the flit-level CRC codes in the flit. In the example, the NIC determines that the flit has been successively received based on the 300 TLPs and the eight flit-level CRC symbols in the received flit. At 1130, if the flit has been successively received, the information contained in the TLPs is sent to a processor. In the example, the payload contained in the TLPs of the successively received flit is sent to the NIC processor.

Method 1100 can optionally include additional actions. For example, the received flit can comprise forward error check (FEC) information received at each of the one or more lanes. In the example, the flit received at the NIC comprises FEC information or codes, three check symbols and three parity symbols, received at each of the eight lanes of the x8 link. In another example, a portion of the flit is received at each lane and determining whether the flit has been successfully received further comprises performing, for each lane, an FEC of the portion of the flit and the FEC codes received at the lane. In the example, 81 flit symbols and 6 FEC symbols are received at each of the eight lanes. The NIC performs eight FEC checks, one per lane, on the 81 flit symbols received at each lane using the 6 FEC symbols received at each lane. The NIC determines that the flit has not been received successfully if any of the eight lane-based FEC checks fail.

In another example, an acknowledgment is sent to the transmitting device before the receiver device receives a pre-determined number of flits after receipt of a flit. In the example, the NIC is programmed to send a flit acknowledgment message to the root complex that the 624-symbol flit has been received before the next, for example, 16 flits are received. In another example, credits are accrued upon determining that a received flit and successive flits have been successfully transmitted, determining that a threshold number of credits have been accrued, and sending credit updates to the transmitting device before a pre-determined number of flits have been received after a pre-determined number of credits have been accrued. In the example, the NIC accrues credits for the received flit and successfully received flit. After the NIC accrues a set of number of credits, the NIC sends credit updates within the receipt of, for example, 8 flits after the set of number of credits have been accrued at the NIC.

In some embodiments, a flit can be protected with a flit-level FEC or parallel-FEC scheme instead of a per-lane FEC scheme. For wider links, flit-level FEC schemes can provide lower latencies and increased efficiencies over per-lane FEC schemes as flit-level FEC schemes may utilize fewer FEC symbols per flit.

Figure 12:
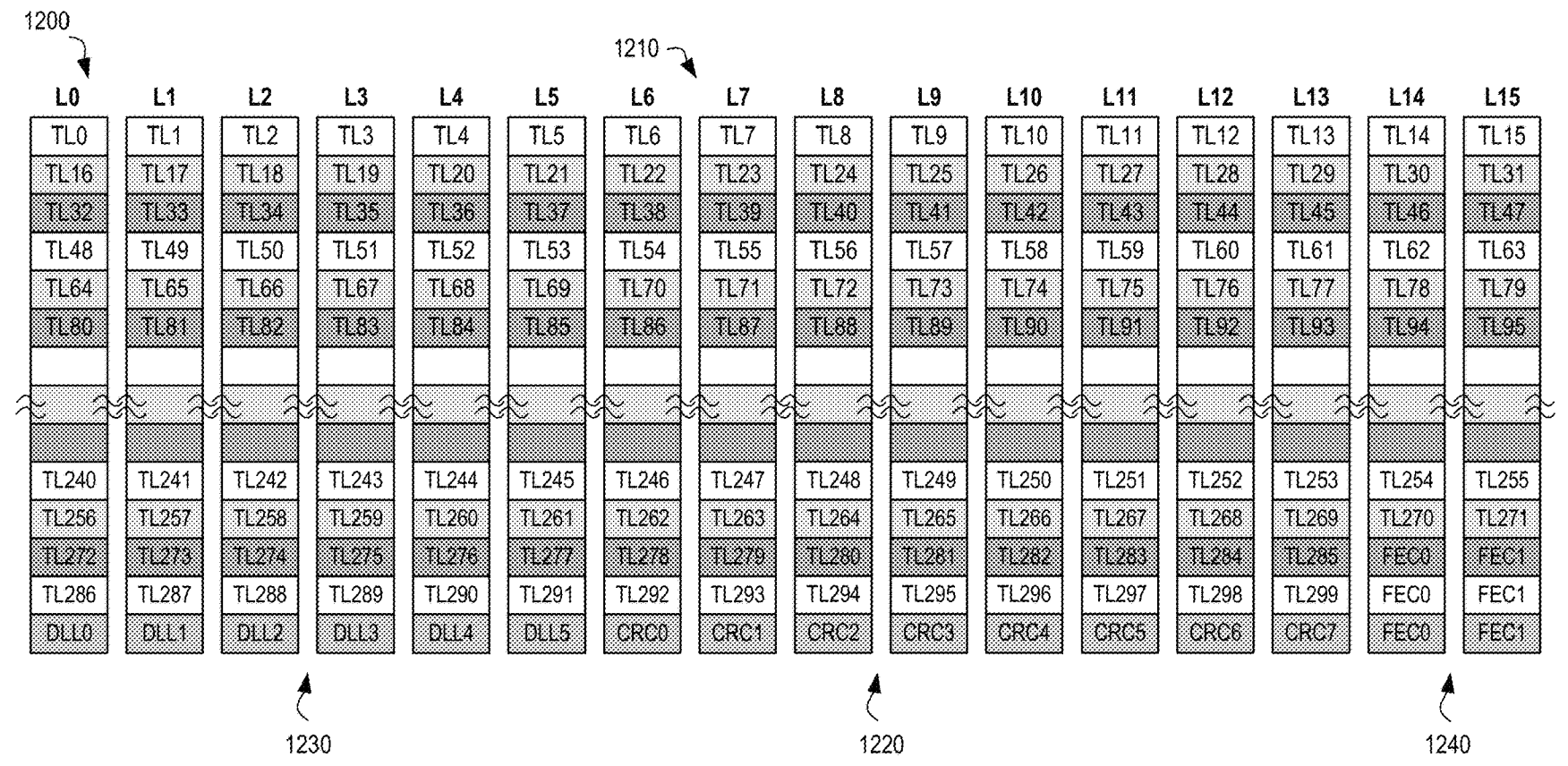

FIG. 12 illustrates an exemplary flit definition for a x16 PCIe link utilizing a flit-level FEC scheme. Flit 1200 comprises transaction layer packet information symbols 1210, flit-level CRC symbols 1220, data link layer packet information symbols 1230, and flit-level FEC symbols 1240. FEC symbols 1240 comprise three two-symbol FEC codes that provide flit-level protection for flit 1200. The FEC symbols 1240 are three-way interleaved to improve FEC resiliency. For example, an interleaved FEC scheme can help avoid a burst error in a lane from affecting multiple symbols protected by an FEC code. The FEC symbol interleaving in flit-level FEC schemes is represented in FIGS. 12, 13A-13B, and 14A-14B by symbol shading. In the three-way interleaving FEC scheme illustrated in these figures, FEC symbols with no shading protect flit symbols with no shading, FEC symbols with light shading protect flit symbols with light shading, and FEC symbols with dark shading protect flit symbols with dark shading. As part of determining whether a flit has been successfully received, a receiving device performs a flit-level FEC check using the FEC codes once all symbols in a flit have been received. If the receiving device determines that the flit has an error that cannot be corrected using the FEC codes, such as symbol errors in two or more lanes affecting the same FEC code, it can send a retry request to the transmitting device requesting that the corrupted flit be retransmitted.

In the flit-level FEC scheme shown in FIG. 12, each FEC code comprises two symbols (FEC0, FEC1) for a total of six FEC symbols that protect flit 1200. In some embodiments, a two-symbol FEC code can comprise a parity symbol and a check symbol, and the two-symbol FEC code can correct one symbol error in the protected symbols. In other embodiments, flit-level FEC schemes can use more of fewer than three FEC codes and use n-way interleaving schemes where n is lesser or greater than three. In embodiments where one symbol is one byte, flit 1200 is 320 bytes: 300 bytes of transaction layer packet information (TL0-TL299), 6 bytes of data link layer packet information (DLL0-DLL5), eight CRC bytes (CRC0-CRC7), and six FEC bytes (three sets of FEC0-1 bytes). The transaction layer packet transmission efficiency for flit 1200 is 93.75% (300 TL bytes/320 total bytes).

Figures 14A, 14B:
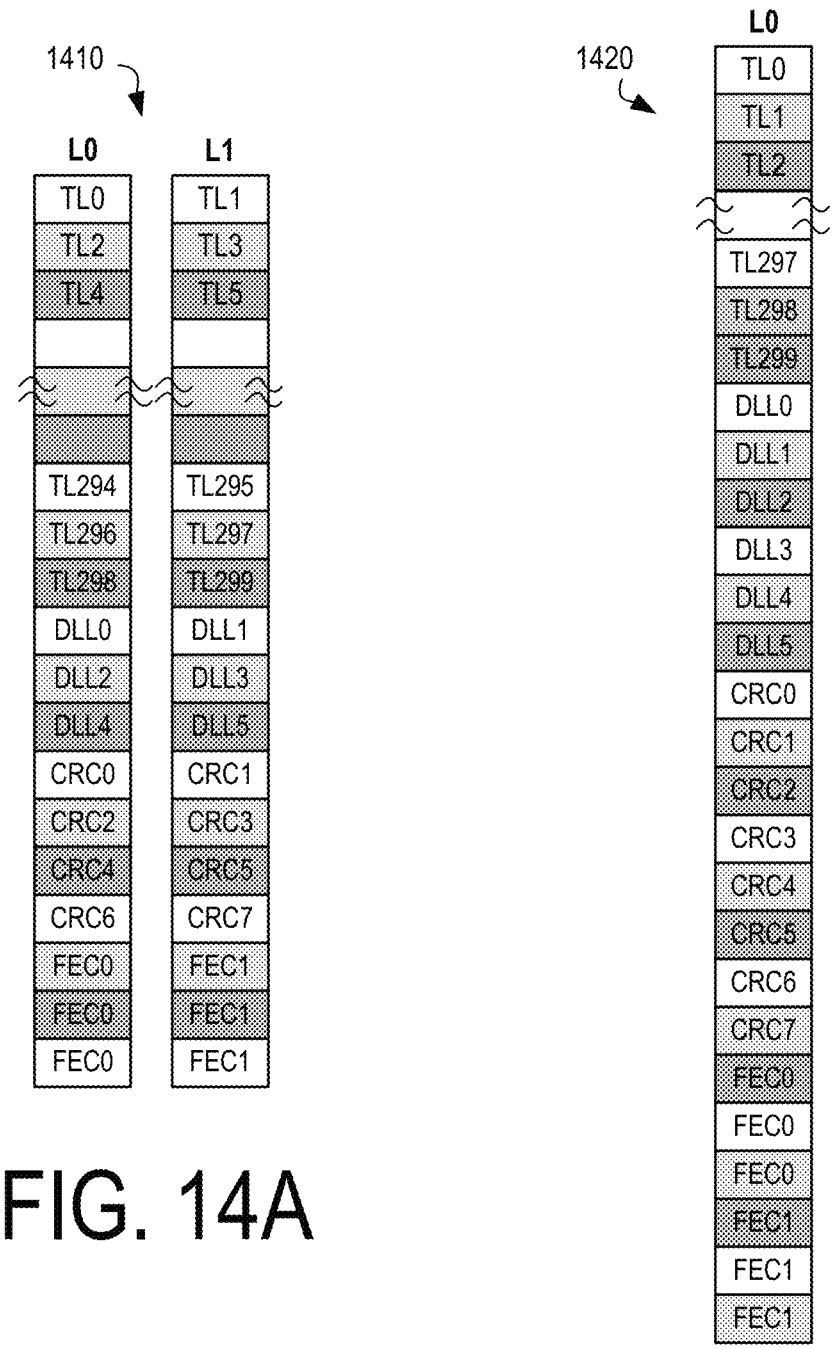
FIGS. 14A-14B illustrate exemplary flit definitions for x2 and x1 PCIe links utilizing flit-level FEC schemes.

FIGS. 13A-13B illustrate exemplary flit definitions for x8 and x4 PCIe links utilizing flit-level FEC schemes and FIGS. 14A-14B illustrate exemplary flit definitions for x2 and x1 PCIe links utilizing flit-level FEC schemes. Flits 1310, 1320, 1410, and 1420 are each comprised of 320 bytes. At the 64 GT/s speeds proposed for PCIe Gen 6 and with one symbol containing 8 bits, flit 1200 is transmitted across a x16 link in 2.5 ns. This transmission speed scales linearly with decreasing link width as each lane transmitting portions of flits 1200, 1310, 1320, 1410 or 1420 carries a linearly increasing number of symbols (20, 40, 80, 160, and 320 for the x16, x8, x4, x2, and x1 links, respectively). These symbols are transmitted over a linearly increasing number of unit intervals (160, 320, 640, 1280, and 2560 unit intervals (UIs) for the x16, x8, x4, x2, and x1 links, respectively) to give transmission speeds of 5 ns, 10 ns, 20 ns, and 40 ns for the x8, x4, x2, and x1 links, respectively. Flits 1200, 1310, 1320, 1410, and 1420 have the same transaction layer packet data transmission efficiency of 93.75% as these flits have the number of FEC codes. Flit-level FEC symbols are shown in flits 1200, 1310, and 1320 as being transmitted across the two upper-most lanes of a link but can be transmitted across any lanes and across any number of lanes.

The 10 ns latency for the 320-byte flits utilizing the flit-level FEC schemes illustrated in FIGS. 12, 13A-13B, and 14A-14B is lower than the latencies for the flits utilized per-lane FEC schemes characterized in FIG. 7. The per-lane FEC flits in FIG. 7 have 10.125 ns latencies at the x4, x8, and x16 link widths and efficiencies of 88.9%, 90.7%, and 91.4% for x4, x8, and x16 widths, respectively. Latencies for per-lane FEC flits for x1 and x2 link widths are 40.5 ns and 20.25 ns and have efficiencies of 94.4% and 92.6%, respectively. Thus, flits 1200, 1310, 1320, 1400, and 1410 utilizing a flit-level FEC scheme have improved efficiencies over their per-lane FEC counterparts characterized in FIG. 7.

Moving from a per-lane FEC scheme to a flit-level FEC scheme can result in a higher retry probability. For example, with reference to FIGS. 15A and 15B, which show tables containing retry characteristics for per-lane and flit-level FEC schemes, for a raw bit error rate of $1.0 \times 10^{-6}$, a flit-level FEC flit transmitted over a x16 link over 160 UIs has a retry probability of $4.131 \times 10^{-5}$ as compared to a retry probability of $3.352 \times 10^{-6}$ for a per-lane FEC flit transmitted over a x16 link over 648 UIs. For embodiments with a 300 ns retry window, the x16 per-lane FEC scheme has a bandwidth loss of 0.0099% and the x16 flit-level FEC scheme has a bandwidth loss of 0.494%.

One approach for improving retry probability in flits utilizing flit-level FEC schemes is to include information in a flit indicating whether one or more preceding flits were null flits. As used herein, the phrase "null flit" refers to a flit having only NULL symbols in the fields reserved for transaction layer packet information.

Figure 16:
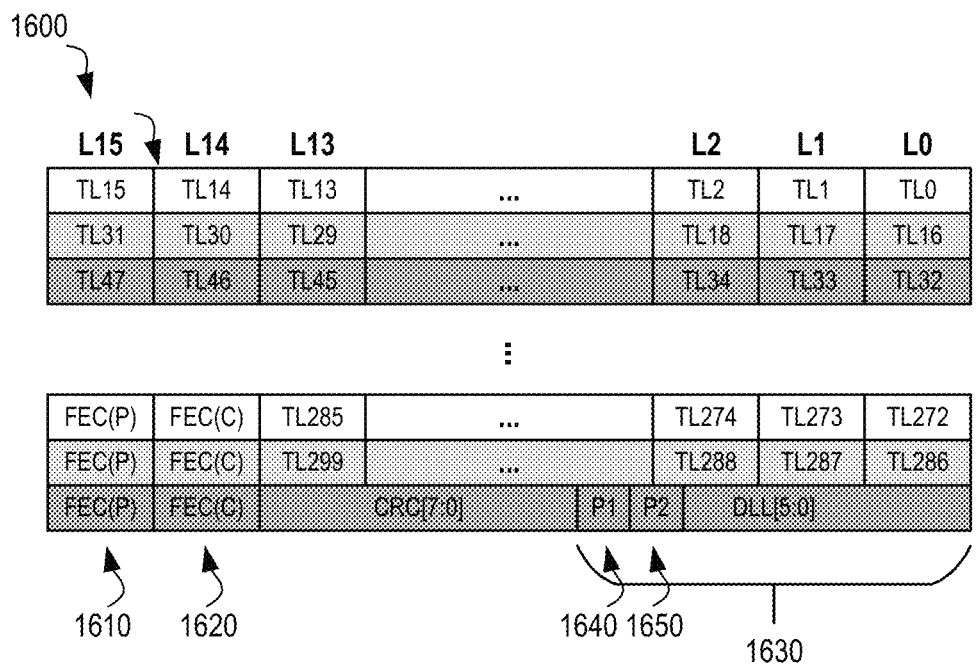
FIG. 16 illustrates an exemplary flit definition for a x16 PCIe link with information indicating whether either of the two preceding flits was null flits.

FIG. 16 illustrates an exemplary flit definition for a x16 PCIe link with information indicating whether either of the two immediately preceding flits was a null flit. Flit 1600 is a 320-symbol flit comprising 300 transaction layer packet information symbols (TL0-TL299), six FEC symbols (three parity symbols FEC(P) 1610 and three check symbols FEC(C) 1620), eight flit-level CRC symbols (CRC[7:0]) and six data link layer packet information symbols (DLL[5:0]) 1630. Data link layer packet information symbols 1630 comprise a first bit P1 1640 indicating whether a first immediately preceding flit was a null flit and a second bit P2 1650 indicating whether a second immediately preceding flit was a null flit.

As used herein, the phrase "first immediately preceding flit" refers to the flit that was transmitted or received immediately prior to a particular flit, and the phrase "second immediately preceding flit" refers to the flit that was transmitted or received immediately prior to a first immediately preceding flit. As used herein, the phrase "immediately seceding flit" refers to the flit that was transmitted or received immediately after a particular flit. For example, if a receiving device receives flits A, B, and C, in that order, then with respect to flit C, flit B is the first immediately preceding flit and flit A is the second immediately preceding flit. Flit A is the first immediately preceding flit with reference to flit B, flit B is the immediately seceding flit with respect to flit A, and flit C is the immediately seceding flit with respect to flit B. The phrases "first immediately preceding flit," "second immediately preceding flit," and "immediately seceding flit" do not preclude the transmission or receipt of non-flit data across a link between flits. Regardless of what type or how much information is transmitted between two flits sent in succession across a link, the flit transmitted first is the first immediately preceding flit relative to the flit transmitted second, and the flit transmitted second is the immediately seceding flit with respect to the flit transmitted first.

Although flit 1600 uses a single bit to indicate whether a preceding flit is a null flit, a null flit can be indicated in other manners. In some embodiments, more than one bit can be used to indicate a null flit. In other embodiments, the sequence number of a preceding flit can be stored along with the information indicating whether the preceding flit is a null flit. Further, null flit information can be stored for more than the two immediately preceding flits, or for any preceding flit, not just the immediately preceding ones (in which case the flit can store the sequence number of the preceding flit as well as the null flit indication). In some embodiments, a flit can store null flit information for just the first immediately preceding flit.

Information in a flit indicating that an immediately preceding flit is a null flit can also be used to indicate that an immediately preceding flit is not a null flit. For example, if a "1" in bits P1 and P2 in flit 1600 indicates an immediately preceding bit is a null flit, a "0" indicates that an immediately preceding bit is a non-null fit.

In some embodiments where a flit contains information indicating that a preceding flit is a null flit, the null flit information can be used as follows. If a receiving device determines that flit n has an error that cannot be corrected with the FEC scheme, the receiving device waits until it receives flit (n+1) before deciding whether to send a retry request to request retransmission of flit n. If the receiving device determines that flit (n+1) has been received successfully after performing flit-level FEC and CRC checks, and flit (n+1) indicates that flit n was a null flit, there is no need for retransmission of flit n and a retry request is not sent.

If the receiving device determines that flit (n+1) also has an error, it waits for receipt of flit (n+2) and determines whether flit (n+2) has been successfully received. If flit (n+2) passes flit-level FEC and CRC checks, and flit (n+2) indicates that both flit n and (n+1) were null flits, then retransmission of flits n and (n+1) is not requested. If flit (n+2) indicates flit n and (n+1) were both not null flits, the receiving device sends a retry request requesting retransmission of flits n and (n+1). If flit (n+2) was not received successfully, a retry request requesting retransmission of flits from flit n onwards, which will cause flits n, (n+1), and (n+2) to be retransmitted, will be sent to the transmitting device.

This approach can be generalized such that a flit contains information indicating which of the immediately preceding m flits are null flits. For example, for the case where m=3, a flit contains information indicating whether each of the first, second, and third immediately preceding flits are null flits. In this scenario, if a receiver determines that three successive flits n, (n+1), and (n+2) have not been successfully received, it looks to flit (n+3) to decide what to do. If flit (n+3) is not successfully received, the receiver sends a retry request requesting retransmission of all flits starting from flit n, since the receiver cannot determine which of flits n, (n+1), and (n+2) may be null flits because flit (n+3) has an uncorrectable error. If flit (n+3) has been successfully received, the receiver determines if any of the preceding flits were null flits and requests retransmission of only the preceding flits that were not null flits. Thus, if flits n, (n+1), and (n+2) were all null flits, no retry request will be sent; if flits n, (n+1), and (n+2) were all non-null flits, they will all be retransmitted; if flits n and (n+2) were null flits and flit (n+1) was a non-null flit, only flit (n+1) will be resent.

A second approach for improving retry probability is to periodically send parity flits. Sending a parity flit after (n−1) flits allows the receiver to correct a flit in the group of n flits determined to have an error instead of having to send a retry request. If parity flits are used in combination with flits including information indicating whether one or more preceding flits was a null flit, if the corrupted flit was a null flit, the corrupted flit is not corrected. If more two or more flits in a group of n flits have errors, a request retry is sent requesting retransmission of the corrupted flits or requesting transmission from the first corrupted flit that is not a null flit received in the group.

Figure 17:
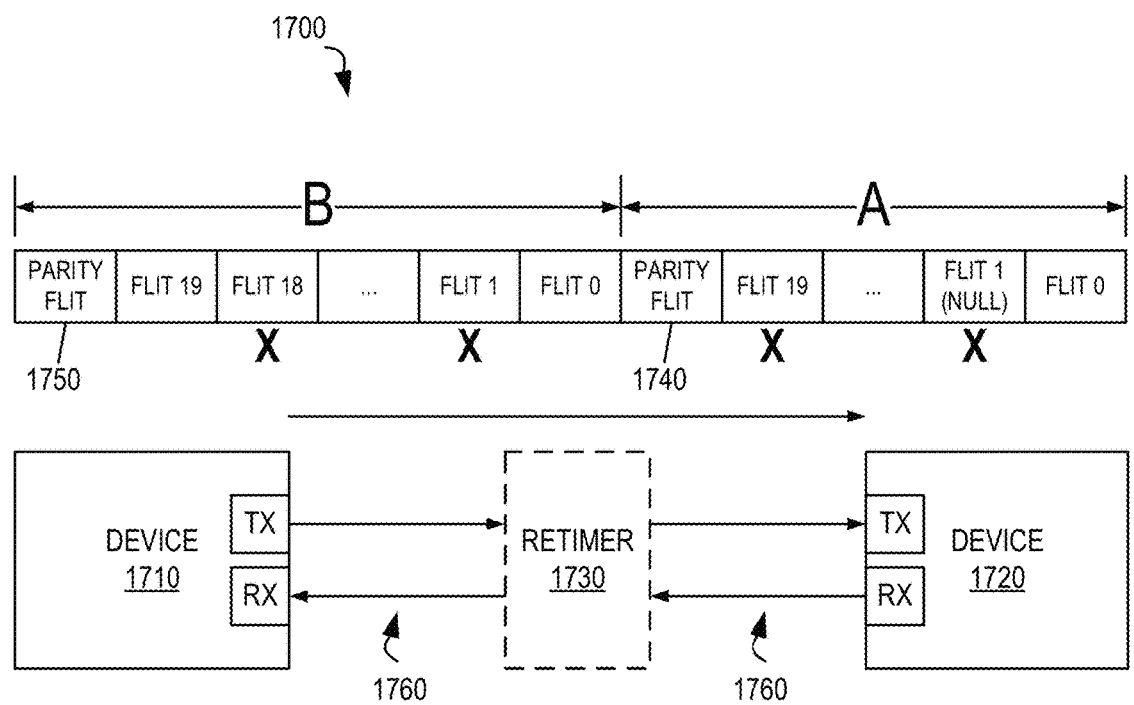
FIG. 17 illustrates an exemplary use of parity flits and flits containing information indicating whether one or more preceding flits was a null flit.

FIG. 17 illustrates an exemplary use of parity flits and flits containing information indicating whether one or more preceding flits was a null flit. FIG. 17 shows groups A and B of 21 flits (20 standard flits plus a parity flit) being sent from device 1710 to device 1720 with an optional retimer 1730 between them. Flits marked with an "X" are determined by device 1720 to have an error. In group A, received flits 1 and 19 have errors. Flit 2 contains information indicating that flit 1 was a null flit and receiver 1720 thus does not need to send a retry request to have flit 1 be retransmitted. With receiver 1720 only needing to correct one flit in group A then, it uses parity flit 1740 to correct flit 19, and thus sends no retry request to correct either of the flits that were received with an error in group A. In group B, flits 1 and 18 have errors and flits 2 and 19 contain information indicating that flits 1 and 18 are not null flits. Thus, receiver 1720 sends a retry request to have all flits from flit 1 retransmitted upon receipt and processing of parity flit 1750, since the received flits of group B contains more corrupted flits (two) than can be corrected with the parity flit.

The parity flit in group B could have been used to correct the error in flit 1 had flit 1 been the only flit with an error. However, because a second flit in the group also had an error, receiver 1720 sends a retry request requesting retransmission of all flits in group B from flit 1. In some embodiments, a retry request can be sent as soon as a flit having an uncorrectable error is detected within a group, thus avoiding having to wait to see if the corrupted flit could be corrected with the parity flit. A receiving device can monitor the utilization rate of a return link (for example, return link 1760 from device 1720 to 1710) and send an earlier retry request if that link is being lightly utilized in order to reduce replay latency. That is, by sending a retry request for flit 1 in group B prior to receipt of parity flit 1750, when receiving device 1720 eventually does receive parity flit 1750 it can correct flit 19 since corrupted flit 1 has already been handled.

In some embodiments, a device can choose between a per-lane FEC scheme and a flit-level FEC scheme. Such a system could choose a flit-level FEC scheme over a per-lane FEC scheme to, for example, reduce latency or if consistent latencies are desired across PCIe links of varying widths with a fixed flit size to achieve performance objectives. A per-lane FEC scheme could be selected in favor of a flit-level FEC if, for example, a link with a lower retry rate is desirable to achieve performance objectives and the lane-to-lane error correction is high.

In some embodiments, a device can enable or disable the generation of parity flits. For example, a device can enable or disable parity flit generation in response to a determined bit error rate for a link. For example, if a determined bit error rate for a link exceeds an enable parity flit threshold value, parity flit generation is enabled. Similarly, if a determined bit error rate for a link drops below a disable parity flit threshold value, parity flit generation is disabled. The bit error rate for a link can be based at least in part on flits transmitted across the link and can be determined by either or both of transmitting and receiving devices connected to the link. The bit error rate can be determined over a pre-determined or variable timing window. In some embodiments, a user can enable or disable parity flits across a set of links for consistent behavior across the links after link pre-characterization.

In addition to the advantages of the technologies disclosed herein that have already been discussed, the technologies disclosed herein can be implemented with a relatively low gate count.

Figure 18:
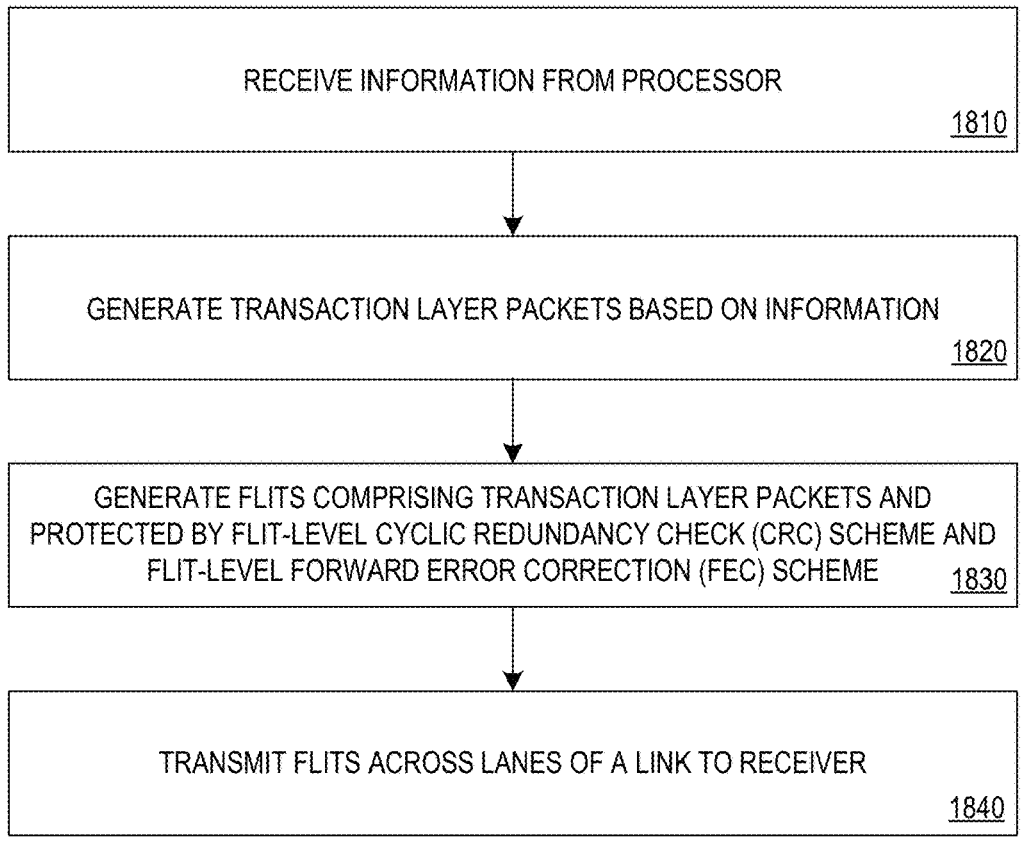
FIG. 18 illustrates an exemplary method of transmitting a flit with a flit-level FEC scheme.

FIG. 18 illustrates an exemplary method of transmitting a flit with a flit-level FEC scheme. The method 1800 can be performed by, for example, a PCIe root complex connected to a graphics card via a x4 PCIe link. At 1810, information is received from a processor. In the example, the root complex PCIe protocol stack receives a message to be sent to the graphics card. At 1820, transaction layer packets are generated based on the received information. In the example, the root complex PCIe protocol stack generates TLPs based on the message to be sent to the graphics card. At 1830, flits comprising the TLPs are generated. The flits comprise the transaction layer packets, and each flit is protected by a flit-level cyclic redundancy check (CRC) scheme and a flit-level forward error correction code (FEC) scheme. In the example, the root complex PCIe protocol stack generates one or more 320-symbol flits containing the TLPs to be sent to the graphics card. The protocol stack protects each flit with eight flit-level CRC codes based on the contents of TLPs and six flit-level FEC codes based on the contents of the TLPs and the CRC codes. At 1840, the flits are transmitted across the lanes of a link to a receiver. In the example, the root complex transmits the flits across the four lanes of the x4 PCIe link to the graphics card. The 320-symbol flits are each broken into four streams of 80 symbols and each stream for each flit is transmitted along one of the lanes of the x4 PCIe link.

Method 1800 can optionally include additional actions. For example, the flit-level CRC codes and the flit-level FEC codes can be transmitted across multiple lanes. In the example, the root complex transmits the eight flit-level CRC codes across the four lanes, two per lane, and the six FEC codes across two of the lanes, three per lane. In another example, the transmitted flits are stored in a replay buffer, a retry request is received to retransmit retry flits from the flits transmitted to the receiver, the retry flits are retrieved from the replay buffer, and the retry flits are retransmitted to the receiving device. Retrieving the retry flits from the replay buffer comprises detecting the presence of a non-contiguous flit sequence stored in the replay buffer and reconstructing flits corresponding to gaps in the non-contiguous flit sequence as null flits to be transmitted as part of the retry flits. In the example, the PCIe root complex stores transmitted flits in its replay buffer except for null flits and receives a retry request from the graphics card to retransmit flits with sequence numbers 10 through 15. The PCIe root complex retrieves flits 10 through 15 from the replay buffer. Flit 12 was a null flit and was therefore not stored in the replay buffer prior to transmission. As part of retrieving the flits from replay buffer, the PCIe root complex detects that the sequence numbers of the flits stored in the replay buffer jump from 11 to 13. That is, the PCIe root complex detects a non-contiguous flit sequence and reconstructs flit 12 as a null fit. The PCIe root complex retransmits flits 10 through 15, including reconstructed null flit 12 to the graphics card.

In another example, parity flits can be generated based on the one or more flits and the parity flit can be transmitted across multiple lanes of the link. In the example, the PCIe complex can generate parity flits for groups of 20 flits and transmit the parity flits across all four lanes of the x4 link to the graphics card. In another example, the flits can contain information indicating that one or more immediately preceding flits are null flits. In the example, the PCIe complex can generate flits containing a first bit indicating whether a first immediately preceding flit was a null flit and a second bit indicating whether a second immediately preceding flit was a null flit.

FIG. 19 illustrates an exemplary method of receiving a flit with a flit-level FEC scheme. The method 1900 can be performed by, for example, a network interface card (NIC). At 1910 flits are received over the lanes of a link. The flits comprise transaction layer packets, flit-level CRC codes, and flit-level FEC codes. In the example, the NIC receives a 320-symbol flit comprising 300 TLPs, 8 flit-level CRC codes, and 6 flit-level FEC codes over a x8 PCIe link from a PCIe root complex. At 1920, it is determined whether the flit has been successively received based on the TLPs, the flit-level CRC codes, and the flit-level FEC codes in the flit. In the example, the NIC determines whether the flit has been successively received by performing a flit-level CRC check based at least on the 300 TLPs and the 8 CRC codes and by performing a flit-level FEC check based at least on the 300 TLPs, the 8 CRC codes, and the 6 FEC codes. At 1930, if the flit has been successively received, the information contained in the TLPs is sent to a processor. In the example, the payloads contained in the TLPs of the successively received flit is sent to the NIC processor.

Method 1900 can optionally include additional actions. For example, a parity flit can be received and if the flit is determined to have not been received successfully, the corrupted flit can be corrected using the parity flit. In the example, the NIC receives a parity flit after receiving the 320-symbol flit. The NIC determines that the flit has not been successively after running a flit-level FEC check using the flit-level FEC symbols and a flit-level CRC check using the CRC codes. The NIC then corrects the corrupted flit using the parity flit. In another example, the flit further comprises information indicating whether one or more immediately preceding flits is a null flit. If the received flit is determined to have not been successfully received, information in the immediately seceding flit is examined to determine whether the corrupted flit was a null flit. If the corrupted flit was a null flit, a retry request to request retransmission of the corrupt flit is not sent. If the corrupted was not a null flit, a retry request is sent. In the example, flits received by the NIC contain information indicating whether the first immediately preceding flit was a null flit. The NIC determines that the flit was not received successfully and receives a second flit, which indicates that the corrupted flit was a null flit, and the NIC does not send a retry request to request retransmission of the corrupted flit.

The technologies, techniques, and embodiments described herein can be performed by any of a variety of computing devices, including mobile devices (e.g., smartphones, tablet computers, laptop computers, media players, portable gaming consoles, cameras and video recorders), non-mobile devices (e.g., desktop computers, servers, stationary gaming consoles, set-top boxes, smart televisions) and embedded devices (e.g., devices incorporated into a vehicle, home, or place of business). As used herein, the term "computing devices" includes computing systems and includes devices comprising multiple discrete physical components.

Figure 20:
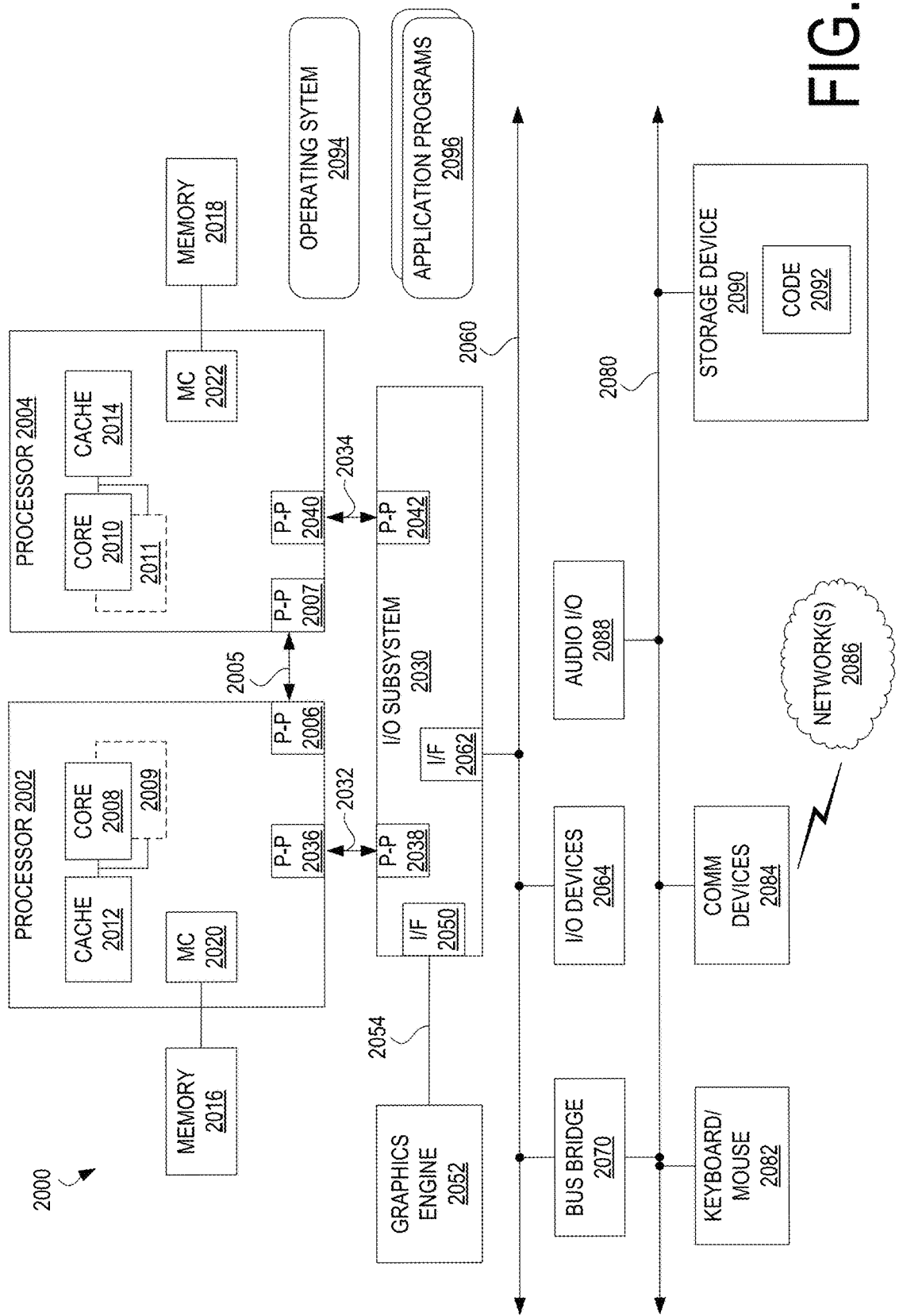
FIG. 20 is a block diagram of an exemplary computing device for transmitting and receiving flits.

FIG. 20 is a block diagram of an exemplary computing device for transmitting and receiving flits. Generally, components shown in FIG. 20 can communicate with other shown components, although not all connections are shown, for ease of illustration. A device 2000 is a multiprocessor system comprising a first processor 2002 and a second processor 2004 and is illustrated as comprising point-to-point (P-P) interconnects. For example, a point-to-point (P-P) interface 2006 of processor 2002 is coupled to a point-to-point interface 2007 of processor 2004 via a point-to-point interconnection 2005. It is to be understood that any or all point-to-point interconnects illustrated in FIG. 20 or in any other figure can be alternatively implemented as a multi-drop bus, and that any or all buses illustrated in FIG. 20 or any other figure could be replaced by point-to-point interconnects.

As shown in FIG. 20, processors 2002 and 2004 are multicore processors. Processor 2002 comprises processor cores 2008 and 2009, and processor 2004 comprises processor cores 2010 and 2011. Processors 2008-2011 can execute computer-executable instructions in a manner similar to that discussed below in connection with FIG. 18, or in other manners.

Processors 2002 and 2004 further comprise at least one shared cache memory 2012 and 2014, respectively. The shared caches 2012 and 2014 can store data (e.g., instructions) utilized by one or more components of the processor, such as the processors 2008-1109 and 2010-2011. The shared caches 2012 and 2014 can be part of a memory hierarchy for device 2000. For example, shared cache 2012 can locally store data that is also stored in a memory 2016 to allow for faster access to the data by components of the processor 2002. In some embodiments, shared caches 2012 and 2014 can comprise multiple cache layers, such as level 1 (L1), level 2 (L2), level 3 (L3), level 4 (L4), and/or other caches or cache layers, such as a last level cache (LLC).

Although the device 2000 is shown with two processors, it can comprise any number of processors. Further, a processor can comprise any number of processors. A processor can take various forms such as a central processing unit, a controller, a graphics processor, an accelerator (such as a graphics accelerator or digital signal processor (DSP)) or a field programmable gate array (FPGA). A processor in a device can be the same as or different from other processors in the device. In some embodiments, device 2000 can comprise one or more processors that are heterogeneous or asymmetric to a first processor, accelerator, FPGA, or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, processors 2002 and 2004 reside in the same die package.

Processors 2002 and 2004 further comprise memory controller logics (MC) 2020 and 2022. As shown in FIG. 20, MCs 2020 and 2022 control memories 2016 and 2018 coupled to processors 2002 and 2004, respectively. The memories 2016 and 2018 can comprise various types of memories, such as volatile memory (e.g., dynamic random-access memories (DRAM), static random-access memory (SRAM)) or non-volatile memory (e.g., flash memory, chalcogenide-based phase-change non-volatile memory). While MCs 2020 and 2022 are illustrated as being integrated into processors 2002 and 2004, in alternative embodiments, the MCs can be logic external to a processor, and can comprise one or more layers of a memory hierarchy.

Processors 2002 and 2004 are coupled to an Input/Output (I/O) subsystem 2030 via P-P interconnections 2032 and 2034. Point-to-point interconnection 2032 connects a point-to-point interface 2036 of processor 2002 with a point-to-point interface 2038 of I/O subsystem 2030, and point-to-point interconnection 2034 connects a point-to-point interface 2040 of processor 2004 with a point-to-point interface 2042 of I/O subsystem 2030. Input/Output subsystem 2030 further includes an interface 2050 to couple I/O subsystem 2030 to a graphics engine 2052, which can be a high-performance graphics engine, graphics processing unit, or a graphics card. The I/O subsystem 2030 and graphics engine 2052 are coupled via a link 2054, which could be a bus or a point-to-point interconnection.

Input/Output subsystem 2030 is further coupled to a first bus 2060 via an interface 2062. The first bus 2060 can be a Peripheral Component Interconnect (PCI) bus, a PCI Express bus, another third generation I/O interconnection bus or any other type of bus.

Various I/O devices 2064 can be coupled to the first bus 2060. A bus bridge 2070 can couple first bus 2060 to a second bus 2080. In some embodiments, the second bus 2080 can be a low pin count (LPC) bus. Various devices can be coupled to the second bus 2080 including, for example, a keyboard/mouse 2082, audio I/O devices 2088 and a storage device 2090, such as a hard disk drive, solid-state drive or other storage device for storing computer-executable instructions (code) 2092. The code 2092 can comprise computer-executable instructions for performing technologies described herein. Additional components that can be coupled to the second bus 2080 include communication device(s) 2084, which can provide for communication between the device 2000 and one or more wired or wireless networks 2086 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

The device 2000 can comprise removable memory such as flash memory cards (e.g., SD (Secure Digital) cards), memory sticks, Subscriber Identity Module (SIM) cards). The memory in device 2000 (including caches 2012 and 2014, memories 2016 and 2018 and storage device 2090) can store data and/or computer-executable instructions for executing an operating system 2094 and application programs 2096. Example data includes web pages, text messages, images, sound files, video data, or other data sets to be sent to and/or received from one or more network servers or other devices by the device 2000 via one or more wired or wireless networks, or for use by the device 2000. The device 2000 can also have access to external memory (not shown) such as external hard drives or cloud-based storage.

The operating system 2094 can control the allocation and usage of the components illustrated in FIG. 20 and support one or more application programs 2096. The application programs 2096 can include common mobile computing device applications (e.g., email applications, calendars, contact managers, web browsers, messaging applications) as well as other computing applications.

The device 2000 can support various input devices, such as a touch screen, microphone, camera, physical keyboard, proximity sensor and trackball, and one or more output devices, such as a speaker and a display. Other possible input and output devices include piezoelectric and other haptic I/O devices. Any of the input or output devices can be internal to, external to or removably attachable with the device 2000. External input and output devices can communicate with the device 2000 via wired or wireless connections.

In addition, the computing device 2000 can provide one or more natural user interfaces (NUIs). For example, the operating system 2094 or applications 2096 can comprise speech recognition logic as part of a voice user interface that allows a user to operate the device 2000 via voice commands. Further, the device 2000 can comprise input devices and logic that allows a user to interact with the device 2000 via a body, hand or face gestures. For example, a user's hand gestures can be detected and interpreted to provide input to a gaming application.

The device 2000 can further comprise one or more communication components 2084. The components 2084 can comprise wireless communication components coupled to one or more antennas to support communication between the system 2000 and external devices. The wireless communication components can support various wireless communication protocols and technologies such as Near Field Communication (NFC), Wi-Fi, Bluetooth, 4G Long Term Evolution (LTE), 5G New Radio (5G), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device 2000 can further include at least one input/output port (which can be, for example, a USB, IEEE 1394 (FireWire), Ethernet and/or RS-232 port) comprising physical connectors; a power supply; a satellite navigation system receiver, such as a GPS receiver; a gyroscope; an accelerometer; a proximity sensor; and a compass. A GPS receiver can be coupled to a GPS antenna. The device 2000 can further include one or more additional antennas coupled to one or more additional receivers, transmitters and/or transceivers to enable additional functions.

In one embodiment, I/O subsystem 2030 is a PCIe root complex, I/O devices 2064 are PCI endpoints, and I/O subsystem 2030 connects to I/O devices 2064 and bus bridge 2070 via any current version of the PCI expression protocol.

It is to be understood that FIG. 20 illustrates only one exemplary computing device architecture for transmitting and receiving flits. Computing devices based on alternative architectures can be used to implement technologies described herein. For example, instead of the processors 2002 and 2004, and the graphics engine 2052 being located on discrete integrated circuits, a computing device can comprise an SoC (system-on-a-chip) integrated circuit incorporating multiple processors, a graphics engine and additional components. Further, a computing device can connect elements via bus or point-to-point configurations different from that shown in FIG. 20. Moreover, the illustrated components in FIG. 20 are not required or all-inclusive, as shown components can be removed and other components added in alternative embodiments.

Figure 21:
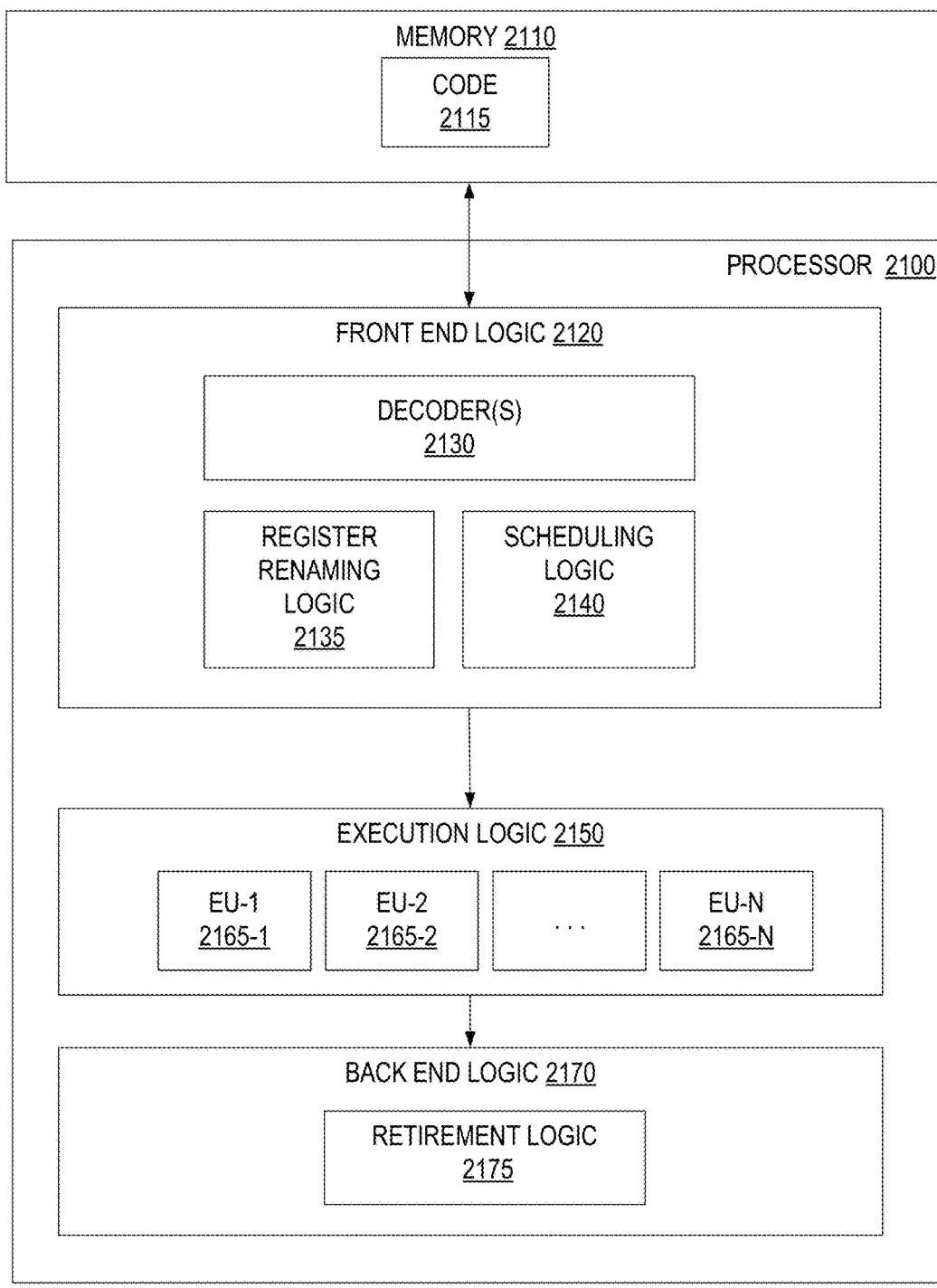
FIG. 21 is a block diagram of an exemplary processor core that can execute instructions as part of implementing technologies described herein.

FIG. 21 is a block diagram of an exemplary processor core that can execute instructions as part of implementing technologies described herein. The processor 2100 can be a core for any type of processor, such as a microprocessor, an embedded processor, a digital signal processor (DSP) or a network processor. The processor 2100 can be a single-threaded core or a multithreaded core in that it may include more than one hardware thread context (or "logical processor") per core.

FIG. 21 also illustrates a memory 2110 coupled to the processor 2100. The memory 2110 can be any memory described herein or any other memory known to those of skill in the art. The memory 2110 can store computer-executable instruction 2115 (code) executable by the processor 2100.

The processor comprises front-end logic 2121 that receives instructions from the memory 2110. An instruction can be processed by one or more decoders 2130. The decoder 2130 can generate as its output a micro operation such as a fixed width micro operation in a predefined format, or generate other instructions, microinstructions, or control signals, which reflect the original code instruction. The front-end logic 2121 further comprises register renaming logic 2135 and scheduling logic 2140, which generally allocate resources and queues operations corresponding to converting an instruction for execution.

The processor 2100 further comprises execution logic 2150, which comprises one or more execution units (EUs) 2165-1 through 2165-N. Some processor embodiments can include several execution units dedicated to specific functions or sets of functions. Other embodiments can include only one execution unit or one execution unit that can perform a particular function. The execution logic 2150 performs the operations specified by code instructions. After completion of execution of the operations specified by the code instructions, back-end logic 2170 retires instructions using retirement logic 2175. In some embodiments, the processor 2100 allows out of order execution but requires in-order retirement of instructions. Retirement logic 2170 can take a variety of forms as known to those of skill in the art (e.g., re-order buffers or the like).

The processor 2100 is transformed during execution of instructions, at least in terms of the output generated by the decoder 2130, hardware registers and tables utilized by the register renaming logic 2135, and any registers (not shown) modified by the execution logic 2150. Although not illustrated in FIG. 21, a processor can include other elements on an integrated chip with the processor 2100. For example, a processor may include additional elements such as memory control logic, one or more graphics engines, I/O control logic and/or one or more caches.

Any of the disclosed methods can be implemented as computer-executable instructions or a computer program product. Such instructions can cause a computer to perform any of the disclosed methods. Generally, as used herein, the term "computer" refers to any computing device or system described or mentioned herein, or any other computing device. Thus, the terms "computer-executable instruction" or "machine-executable instruction" refers to instructions that can be executed by any computing device described or mentioned herein, or any other computing device.

The computer-executable instructions or computer program products as well as any data created and used during implementation of the disclosed technologies can be stored on one or more tangible or non-transitory computer-readable storage media, such as optical media discs (e.g., DVDs, CDs), volatile memory components (e.g., DRAM, SRAM), or non-volatile memory components (e.g., flash memory, solid state drives, chalcogenide-based phase-change non-volatile memories). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be executed, for example, on a single computing device or in a network environment using one or more network computers. Further, it is to be understood that the disclosed technology is not limited to any specific computer language or program. For instance, the disclosed technologies can be implemented by software written in C++, Java, Perl, JavaScript, Adobe Flash, or any other suitable programming language. Likewise, the disclosed technologies are not limited to any particular computer or type of hardware.

Furthermore, any of the software-based embodiments (comprising, for example, computer-executable instructions for causing a computer to perform any of the disclosed methods) can be uploaded, downloaded or remotely accessed through suitable communication methods. Such suitable communication methods include, for example, the Internet, the World Wide Web, an intranet, cable (including fiber optic cable), magnetic communications, electromagnetic communications (including RF, microwave, and infrared communications), or electronic communications.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 22:
FIG. 22 illustrates an exemplary computer-readable non-transitory storage medium.

Furthermore, the present disclosure may take the form of a computer program product embodied in any tangible or non-transitory medium of expression having computer-usable program code embodied in the medium. FIG. 22 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 2202 may include several programming instructions 2204. Programming instructions 2204 may be configured to enable a device, e.g., device 2200, in response to execution of the programming instructions, to perform, e.g., various programming operations associated with operating system functions and/or applications, in particular, operations associated with flit based packetization technology described above with references to FIGS. 1-2.

In alternate embodiments, programming instructions 2204 may be disposed on multiple computer-readable non-transitory storage media 2202 instead. In alternate embodiments, programming instructions 2204 may be disposed on computer-readable transitory storage media 2202, such as signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instruction for executing a computer process.

The disclosed embodiments may be implemented, in some cases, in a hardware component or device, firmware or software running on a processor, or a combination thereof, or any combination thereof.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrase "at least one of A, B or C" can mean A; B; C; A and B; A and C; B and C; or A, B, and C.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

As used in any embodiment herein, the term "module" may refer to software, firmware and/or circuitry to perform one or more operations consistent with the present disclosure. Software may be embodied as a software package, code (e.g., routines, programs, objects, components, data structures), instructions, instruction sets and/or data recorded on non-transitory computer readable storage mediums. Firmware may be embodied as code, instructions or instruction sets and/or data that are hard-coded (e.g., non-volatile) in memory devices.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that provide the described functionality. In some embodiments, the circuitry may execute one or more software or firmware programs to provide at least some of the described functionality.

The term "circuitry" may also refer to processor circuitry or interface circuitry. As used herein, the term "processor circuitry" may refer to, is part of, or includes circuitry to sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device that can execute or otherwise operate computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems are solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

The following examples pertain to additional embodiments of technologies disclosed herein.

Example 1 is a method comprising: receiving information from the processor; generating one or more transaction layer packets based on the information; generating one or more flits comprising the transaction layer packets, individual of the flits protected by a flit-level cyclic redundancy check (CRC) scheme and a flit-level forward error correction (FEC) scheme; and transmitting the one or more flits across one or more lanes of a link to a receiving device.

Example 2 is the method of Example 1, wherein individual of the flits comprise one or more flit-level FEC codes to implement the flit-level FEC scheme, the protocol stack to further transmit the one or more flit-level FEC codes across at least one of the one or more lanes.

Example 3 is the method of Example 1, wherein the flit-level FEC scheme is an interleaved scheme.

Example 4 is the method of Example 1, wherein the protocol stack is further to store transmitted flits that are not null flits in a replay buffer.

Example 5 is the method of Example 4, further comprising: receiving a retry request from the receiving device to retransmit at least one retry flits of the one or more flits; retrieving the at least one retry flits from the replay buffer, the retrieving comprising: detecting the presence of a non-contiguous flit sequence stored in the replay buffer; and reconstructing flits corresponding to gaps in the non-contiguous flit sequence as null flits to be transmitted to the receiving device as part of the retry flits; and retransmitting the at least one retry flits.

Example 6 is the method of Example 1, further comprising: generating a parity flit based on the one or more flits; and transmitting the parity flit across the one or more lanes of the link to the receiving device.

Example 7 is the method of Example 1, further comprising: determining that a bit error rate for the link exceeds an enable parity flit generation threshold; enabling parity flit generation in response to determining that the bit error rate exceeds the enable parity flit generation threshold; generating a parity flit based on the one or more flits; and transmitting the parity flit across the one or more lanes of the link to the receiving device.

Example 8 is the method of Example 1, wherein at least one of the flits comprises information indicating whether one or more immediately preceding flits is a null flit.

Example 9 is the method of Example 1, wherein at least one of the flits comprises information indicating whether a first immediately preceding flit is a null flit and information indicating whether a second immediately preceding flit is a null flit.

Example 10 is a method comprising: receiving one or more flits across one or more lanes of a link from a transmitting device, individual of the flits comprising one or more transaction layer packets, one or more flit-level cyclic redundancy check (CRC) codes, and one or more flit-level forward error correction (FEC) codes; and for individual of the flits: determining whether the individual flit has been successfully received by: performing a flit-level CRC check based at least in part on the transaction layer packets and the flit-level CRC codes; and performing a flit-level FEC check based at least in part on the transaction layer packets, the flit-level CRC codes, and the flit-level FEC codes; and sending information contained in the transaction layer packets of the individual flit to the processor in response to determining that the individual flit has been successfully received.

Example 11 the method of Example 10, wherein the flit-level FEC codes are received at one or more of the lanes.

Example 12 the method of Example 10, wherein the flit-level FEC scheme is an interleaved scheme.

Example 13 the method of Example 10, further comprising: receiving a parity flit across the one or more lanes of the link from the transmitting device; determining that a corrupted flit from among the one or more flits that have not been successively received is not a null flit; and correcting the corrupted flit using the parity flit.

Example 14 the method of Example 10, further comprising: receiving a parity flit across the one or more lanes of the link from the transmitting device; determining that two or more corrupted flits of the one or more flits that have not been successfully received are not null flits; and sending a retry request to the transmitting device requesting retransmission of the two or more corrupted flits.

Example 15 the method of Example 10, wherein at least one of the flits further comprises information indicating whether one or more immediately preceding flits is a null flit.

Example 16 the method of Example 10, wherein at least one of the flits further comprises information indicating whether a first immediately preceding flit is a null flit and information indicating whether a second immediately preceding flit is a null flit.

Example 17 the method of Example 10, wherein individual of the one or more flits further comprises information indicating whether one or more immediately preceding flits is a null flit, the method further comprising in response to determining that a first flit of the one or more flits has not been received successfully and that a second flit immediately seceding the first flit has been received successfully, sending a retry request to the transmitting device requesting retransmission of the first flit if the information indicating whether one or more immediately preceding flits in the second flit indicates that the first flit is a not a null flit.

Example 18 the method of Example 10, wherein individual of the one or more flits further comprises information indicating whether one or more immediately preceding flits is a null flit, the method further comprising: in response to determining that a first flit of the one or more flits has not been received successfully and that the information indicating whether one or more immediately preceding flits in a second flit immediately seceding the first flit indicates that the first flit is a null flit, not sending a retry request to the transmitting device to request retransmit the first flit.

Example 19 the method of Example 10, wherein individual of the one or more flits further comprises information indicating whether one or more preceding flits is a null flit, the method further comprising in response to determining that a first flit of the one or more flits has not been received successfully and that a second flit immediately seceding the first flit has been not been received successfully and that a third flit immediately seceding the second flit has been received successfully, sending a retry request to request retransmission of at least the first flit if the information indicating whether one or more preceding flits in the third flit indicates that the first flit is not a null flit.

Example 20 the method of Example 10, wherein individual of the one or more flits further comprises information indicating whether one or more preceding flits is a null flit, the method further comprising in response to determining that a first flit of the one or more flits has not been received successfully and that a second flit immediately seceding the first flit has been not been received successfully and that a third flit immediately seceding the second flit has been received successfully, sending a retry request to request retransmission of at least the second flit if the information indicating whether one or more preceding flits in the third flit indicates that the second flit is not a null flit.

Example 21 the method of Example 10, wherein individual of the one or more flits further comprises information indicating whether one or more preceding flits is a null flit, the method further comprising in response to determining that a first flit of the one or more flits has not been received successfully and that a second flit immediately seceding the first flit has been not been received successfully and that a third flit immediately seceding the second flit has been received successfully, sending a retry request to request retransmission of the first flit and the second flit if the information indicating whether one or more preceding flits in the third flit indicates that the first flit and the second flit are not null flits.

Example 22 the method of Example 10, wherein individual of the one or more flits further comprises information indicating whether one or more preceding flits is a null flit, the method further comprising in response to determining that a first flit of the one or more flits has not been received successfully and that a second flit immediately seceding the first flit has been not been received successfully and that a third flit immediately seceding the second flit has not been received successfully, sending a retry request to request retransmission of the first flit, the second flit, and the third flit if the information indicating whether one or more preceding flits in the third flit indicates that the first flit and the second flit are not null flits.

Example 23 the method of Example 10, wherein individual of the one or more flits further comprises information indicating whether one or more preceding flits is a null flit, the method further comprising in response to determining that m flits received in succession have not been received successfully and a flit immediately seceding the last of the m flits received in succession has been received successfully, sending a retry request to request retransmission of the flits from among the m flits that are not null flits.

Example 24 the method of Example 10, wherein individual of the one or more flits further comprises information indicating whether one or more preceding flits is a null flit, the method further comprising in response to determining that m flits received in succession have not been received successfully and a flit immediately seceding the last of the m flits received in succession has not been received successfully, sending a retry request to request retransmission of the m flits and the flit immediately seceding the last of the m flits.

Example 25 is one or more computer-readable storage media storing computer-executable instructions for causing a device to perform any of the methods of Examples 1 through 24.

Example 26 is a device comprising a processor; and a protocol stack to: receive information from the processor; generate one or more transaction layer packets based on the information; generate one or more flits comprising the transaction layer packets, individual of the flits protected by a flit-level cyclic redundancy check (CRC) scheme and a flit-level forward error correction (FEC) scheme; and transmit the one or more flits across one or more lanes of a link to a receiving device.

Example 27 is the device of Example 26, wherein individual of the flits comprise one or more flit-level FEC codes to implement the flit-level FEC scheme, the protocol stack to further transmit the one or more flit-level FEC codes across at least one of the one or more lanes.

Example 28 is the device of Example 26, wherein the flit-level FEC scheme is an interleaved scheme.

Example 29 is the device of Example 26, wherein the protocol stack is further to store transmitted flits that are not null flits in a replay buffer.

Example 30 is the device of Example 29, wherein the protocol stack is further to: receive a retry request from the receiving device to retransmit at least one retry flits of the one or more flits; retrieve the at least one retry flits from the replay buffer, the retrieving comprising: detecting the presence of a non-contiguous flit sequence stored in the replay buffer; and reconstructing flits corresponding to gaps in the non-contiguous flit sequence as null flits to be transmitted to the receiving device as part of the retry flits; and retransmit the at least one retry flits.

Example 31 is the device of Example 26, wherein the device is a PCIe root complex.

Example 32 is the device of Example 26, wherein the device is a graphics card.

Example 33 is the device of Example 26, the processor further to: generate a parity flit based on the one or more flits; and transmit the parity flit across the one or more lanes of the link to the receiving device.

Example 34 is the device of Example 26, the processor further to: determine that a bit error rate for the link exceeds an enable parity flit generation threshold; enable parity flit generation in response to determining that the bit error rate exceeds the enable parity flit generation threshold; generate a parity flit based on the one or more flits; and transmit the parity flit across the one or more lanes of the link to the receiving device.

Example 35 is the device of Example 26, wherein at least one of the flits comprises information indicating whether one or more immediately preceding flits is a null flit.

Example 36 is the device of Example 26, wherein at least one of the flits comprises information indicating whether a first immediately preceding flit is a null flit and information indicating whether a second immediately preceding flit is a null flit.

Example 37 is a device, comprising: a processor; and a protocol stack to: receive one or more flits across one or more lanes of a link from a transmitting device, individual of the flits comprising one or more transaction layer packets, one or more flit-level cyclic redundancy check (CRC) codes, and one or more flit-level forward error correction (FEC) codes; and for individual of the flits: determine whether the individual flit has been successfully received by: performing a flit-level CRC check based at least in part on the transaction layer packets and the flit-level CRC codes; and performing a flit-level FEC check based at least in part on the transaction layer packets, the flit-level CRC codes, and the flit-level FEC codes; and send information contained in the transaction layer packets of the individual flit to the processor in response to determining that the individual flit has been successfully received.

Example 38 is the device of Example 37, wherein the flit-level FEC codes are received at one or more of the lanes.

Example 39 is the device of Example 37, wherein the flit-level FEC scheme is an interleaved scheme.

Example 40 is the device of Example 37, wherein the device is a PCIe root complex.

Example 41 is the device of Example 37, wherein the device is a graphics card.

Example 42 is the device of Example 37, the processor to further: receive a parity flit across the one or more lanes of the link from the transmitting device; determine that a corrupted flit from among the one or more flits that have not been successively received is not a null flit; and correct the corrupted flit using the parity flit.

Example 43 is the device of Example 37, the processor to further: receive a parity flit across the one or more lanes of the link from the transmitting device; determine that two or more corrupted flits of the one or more flits that have not been successfully received are not null flits; and send a retry request to the transmitting device requesting retransmission of the two or more corrupted flits.

Example 44 is the device of Example 37, wherein at least one of the flits further comprises information indicating whether one or more immediately preceding flits is a null flit.

Example 45 is the device of Example 37, wherein at least one of the flits further comprises information indicating whether a first immediately preceding flit is a null flit and information indicating whether a second immediately preceding flit is a null flit.

Example 46 is the device of Example 37, wherein individual of the one or more flits further comprises information indicating whether one or more immediately preceding flits is a null flit, the processor further to: in response to determining that a first flit of the one or more flits has not been received successfully and that a second flit immediately seceding the first flit has been received successfully, send a retry request to the transmitting device requesting retransmission of the first flit if the information indicating whether one or more immediately preceding flits in the second flit indicates that the first flit is a not a null flit.

Example 47 is the device of Example 37, wherein individual of the one or more flits further comprises information indicating whether one or more immediately preceding flits is a null flit, the processor further to: in response to determining that a first flit of the one or more flits has not been received successfully and that the information indicating whether one or more immediately preceding flits in a second flit immediately seceding the first flit indicates that the first flit is a null flit, not send a retry request to the transmitting device to request retransmit the first flit.

Example 48 is the device of Example 37, wherein individual of the one or more flits further comprises information indicating whether one or more preceding flits is a null flit, the processor further to: in response to determining that a first flit of the one or more flits has not been received successfully and that a second flit immediately seceding the first flit has been not been received successfully and that a third flit immediately seceding the second flit has been received successfully, send a retry request to request retransmission of at least the first flit if the information indicating whether one or more preceding flits in the third flit indicates that the first flit is not a null flit.

Example 49 is the device of Example 37, wherein individual of the one or more flits further comprises information indicating whether one or more preceding flits is a null flit, the processor further to: in response to determining that a first flit of the one or more flits has not been received successfully and that a second flit immediately seceding the first flit has been not been received successfully and that a third flit immediately seceding the second flit has been received successfully, send a retry request to request retransmission of at least the second flit if the information indicating whether one or more preceding flits in the third flit indicates that the second flit is not a null flit.

Example 50 is the device of Example 37, wherein individual of the one or more flits further comprises information indicating whether one or more preceding flits is a null flit, the processor further to: in response to determining that a first flit of the one or more flits has not been received successfully and that a second flit immediately seceding the first flit has been not been received successfully and that a third flit immediately seceding the second flit has been received successfully, send a retry request to request retransmission of the first flit and the second flit if the information indicating whether one or more preceding flits in the third flit indicates that the first flit and the second flit are not null flits.

Example 51 is the device of Example 37, wherein individual of the one or more flits further comprises information indicating whether one or more preceding flits is a null flit, the processor further to: in response to determining that a first flit of the one or more flits has not been received successfully and that a second flit immediately seceding the first flit has been not been received successfully and that a third flit immediately seceding the second flit has not been received successfully, send a retry request to request retransmission of the first flit, the second flit, and the third flit if the information indicating whether one or more preceding flits in the third flit indicates that the first flit and the second flit are not null flits.

Example 52 is the device of Example 37, wherein individual of the one or more flits further comprises information indicating whether one or more preceding flits is a null flit, the processor further to: in response to determining that m flits received in succession have not been received successfully and a flit immediately seceding the last of the m flits received in succession has been received successfully, send a retry request to request retransmission of the flits from among the m flits that are not null flits.

Example 53 is the device of Example 37, wherein individual of the one or more flits further comprises information indicating whether one or more preceding flits is a null flit, the processor further to: in response to determining that m flits received in succession have not been received successfully and a flit immediately seceding the last of the m flits received in succession has not been received successfully, send a retry request to request retransmission of the m flits and the flit immediately seceding the last of the m flits.

Example 54 is a system, comprising: a receiving device comprising a receiving device processor; a transmitting device to transmit a flit to the receiving device, the flit comprising one or more transaction layer packets, one or more flit-level CRC codes, and one or more flit-level FEC codes; and a link connecting the transmitting device to the receiving device, the link comprising one or more lanes; the flit to be transmitted across the one or more lanes; wherein the receiving device is to: receive the flit; determine whether the flit has been successively received by performing a cyclic redundancy check based at least in part on the transaction layer packets and the flit-level CRC codes and a forward error correction check based at least in part on the transaction layer packets, the flit-level CRC codes, and the flit-level FEC codes; and send information contained in the transaction layer packets to the receiving device processor if the flit has been successively received.

Example 55 is a device, comprising: a processor; a protocol stack to receive information from the processor; and a generating means to generate one or more flits comprising one or more transaction layer packets, each flit protected by a flit-level cyclic redundancy check (CRC) scheme; wherein the protocol stack is further to transmit the flits across one or more lanes across a link to a receiving device.

Example 56 is the device of Example 55, the protocol stack further to receive a retry request from the receiving device to retransmit at least one retry flits of the one or more flits; the device further comprising a retrieval means to retrieve the at least one retry flits from the replay buffer, the retrieval means to: detect the presence of a non-contiguous flit sequence stored in the replay buffer; and reconstruct flits corresponding to gaps in the non-contiguous flit sequence as null flits to be transmitted to the receiving device as part of the retry flits; and the protocol stack further to retransmit the at least one retry flits.

Example 57 is the device of Example 55, the generating means further to generate a parity flit based on the one or more flits; the protocol stack further to transmit the parity flit across the one or more lanes of the link to the receiving device.

Example 58 is a device, comprising: a processor; a protocol stack to receive one or more flits across one or more lanes of a link from a transmitting device, individual of the flits comprising one or more transaction layer packets, one or more flit-level cyclic redundancy check (CRC) codes, and one or more flit-level forward error correction (FEC) codes; and a determining means to determine whether, for individual of the flits, the individual flit has been successfully received by performing a CRC check based at least in part on the transaction layer packets and the flit-level CRC codes and an FEC check based at least in part on the transaction layer packets, the flit-level CRC codes, and the FEC codes; wherein the protocol stack is further to send information contained in the transaction layer packets to the processor for the flits that have been successfully received.

Example 58 is a PCIe endpoint, comprising: a processor; and a PCIe protocol stack to: receive first information from the processor; generate one or more first transaction layer packets based at least in part on the first information; generate a first flit comprising the first transaction layer packets, one or more flit-level cycling redundancy check (CRC) codes, and one or more first flit-level forward error correction (FEC) codes; transmit the first flit across one or more lanes of a PCIe link to a receiving device; receive a second flit across the one or more lanes of the PCIe link, the second flit comprising one or more second transaction layer packets, one or more second flit-level CRC codes, and one or more second flit-level FEC codes; determine whether the second flit has been successfully received, the determining comprising: performing a flit-level CRC check on the second flit based at least in part on the second transaction layer packets and the second flit-level CRC codes; and performing a flit-level FEC check on the second flit based at least in part on the second transaction layer packets, the second flit-level CRC codes, and the second flit-level FEC codes; and send second information contained in the second transaction layer packets to the processor in response to determining that the second flit has been successfully received.

I claim:

1. A device, comprising:
   a processor; and
   a protocol stack to:
   receive information from the processor;
   generate one or more transaction layer packets based on the information;
   generate one or more flits comprising the transaction layer packets (TLPs), individual of the flits protected by a flit-level cyclic redundancy check (CRC) scheme and a flit-level forward error correction (FEC) scheme, wherein individual of the flits comprise a plurality of FEC codes, each FEC code corresponding to a respective subset of TLPs of the flit, and wherein the TLPs of the respective subsets are interleaved in the flit; and
   transmit the one or more flits across one or more lanes of a link to a receiving device.

2. The device of claim 1, wherein the protocol stack is further to store transmitted flits that are not null flits in a replay buffer.

3. The device of claim 2, wherein the protocol stack is further to:
   receive a retry request from the receiving device to retransmit at least one retry flits of the one or more flits;
   retrieve the at least one retry flits from the replay buffer, the retrieving comprising:
   detecting the presence of a non-contiguous flit sequence stored in the replay buffer; and
   reconstructing flits corresponding to gaps in the non-contiguous flit sequence as null flits to be transmitted to the receiving device as part of the retry flits; and
   retransmit the at least one retry flits.

4. The device of claim 1, wherein the device is a PCIe root complex.

5. The device of claim 1, wherein the device is a graphics card.

6. The device of claim 1, the processor further to:
   generate a parity flit based on the one or more flits; and
   transmit the parity flit across the one or more lanes of the link to the receiving device.

7. The device of claim 1, the processor further to:
   determine that a bit error rate for the link exceeds an enable parity flit generation threshold;
   enable parity flit generation in response to determining that the bit error rate exceeds the enable parity flit generation threshold;
   generate a parity flit based on the one or more flits; and
   transmit the parity flit across the one or more lanes of the link to the receiving device.

8. The device of claim 1, wherein at least one of the flits comprises information indicating whether one or more immediately preceding flits is a null flit.

9. A method, comprising:
   receiving information from the processor;
   generating one or more transaction layer packets based on the information;
   generating one or more flits comprising the transaction layer packets, individual of the flits protected by a flit-level cyclic redundancy check (CRC) scheme and an interleaved flit-level forward error correction (FEC) scheme, wherein individual of the flits comprise a plurality of FEC codes, each FEC code corresponding to a respective subset of TLPs of the flit, and wherein the TLPs of the respective subsets are interleaved in the flit; and
   transmitting the one or more flits across one or more lanes of a link to a receiving device.

10. The method of claim 9, wherein the protocol stack is further to store transmitted flits that are not null flits in a replay buffer.

11. The method of claim 10, further comprising:
    receiving a retry request from the receiving device to retransmit at least one retry flits of the one or more flits;
    retrieving the at least one retry flits from the replay buffer, the retrieving comprising:
    detecting the presence of a non-contiguous flit sequence stored in the replay buffer; and
    reconstructing flits corresponding to gaps in the non-contiguous flit sequence as null flits to be transmitted to the receiving device as part of the retry flits; and
    retransmitting the at least one retry flits.

12. The method of claim 9, further comprising:
    generating a parity flit based on the one or more flits; and
    transmitting the parity flit across the one or more lanes of the link to the receiving device.

13. The method of claim 9, further comprising:
    determining that a bit error rate for the link exceeds an enable parity flit generation threshold;
    enabling parity flit generation in response to determining that the bit error rate exceeds the enable parity flit generation threshold;
    generating a parity flit based on the one or more flits; and
    transmitting the parity flit across the one or more lanes of the link to the receiving device.

14. The method of claim 9, wherein at least one of the flits comprises information indicating whether one or more immediately preceding flits is a null flit.

15. One or more non-transitory computer-readable storage media storing computer-executable instructions for causing a device to perform a method, the method comprising:
    receiving information from the processor;
    generating one or more transaction layer packets based on the information;

generating one or more flits comprising the transaction layer packets, individual of the flits protected by a flit-level cyclic redundancy check (CRC) scheme and a flit-level forward error correction (FEC) scheme, wherein individual of the flits comprise a plurality of FEC codes, each FEC code corresponding to a respective subset of TLPs of the flit, and wherein the TLPs of the respective subsets are interleaved in the flit; and transmitting the one or more flits across one or more lanes of a link to a receiving device.

16. The one or more computer-readable storage media of claim 15, wherein the protocol stack is further to store transmitted flits that are not null flits in a replay buffer.

17. The one or more computer-readable storage media of claim 16, further comprising:
receiving a retry request from the receiving device to retransmit at least one retry flits of the one or more flits;
retrieving the at least one retry flits from the replay buffer, the retrieving comprising:
detecting the presence of a non-contiguous flit sequence stored in the replay buffer; and
reconstructing flits corresponding to gaps in the non-contiguous flit sequence as null flits to be transmitted to the receiving device as part of the retry flits; and
retransmitting the at least one retry flits.

18. The one or more computer-readable storage media of claim 15, further comprising:
generating a parity flit based on the one or more flits; and
transmitting the parity flit across the one or more lanes of the link to the receiving device.

19. The one or more computer-readable storage media of claim 15, wherein at least one of the flits comprises information indicating whether one or more immediately preceding flits is a null flit.

20. A device, comprising:
a processor;
a protocol stack to receive information from the processor; and
a generating means to generate one or more flits comprising one or more transaction layer packets, each flit protected by an interleaved flit-level cyclic redundancy check (CRC) scheme and a flit-level forward error correction (FEC) scheme, wherein individual of the flits comprise a plurality of FEC codes, each FEC code corresponding to a respective subset of TLPs of the flit, and wherein the TLPs of the respective subsets are interleaved in the flit;
wherein the protocol stack is further to transmit the flits across one or more lanes across a link to a receiving device.

21. The device of claim 20, the protocol stack further to receive a retry request from the receiving device to retransmit at least one retry flits of the one or more flits;
the device further comprising a retrieval means to retrieve the at least one retry flits from the replay buffer, the retrieval means to:
detect the presence of a non-contiguous flit sequence stored in the replay buffer; and
reconstruct flits corresponding to gaps in the non-contiguous flit sequence as null flits to be transmitted to the receiving device as part of the retry flits; and
the protocol stack further to retransmit the at least one retry flits.

22. The device of claim 20, the generating means further to generate a parity flit based on the one or more flits; the protocol stack further to transmit the parity flit across the one or more lanes of the link to the receiving device.

23. The device of claim 1, wherein the plurality of FEC codes comprises a first FEC code corresponding to first TLPs of the flit, a second FEC code corresponding to second TLPs of the flit, and a third FEC code corresponding to third TLPs of the flit, the first TLPs, second TLPs, and third TLPs being interleaved across symbols of the flit.

24. The method of claim 9, wherein the plurality of FEC codes comprises a first FEC code corresponding to first TLPs of the flit, a second FEC code corresponding to second TLPs of the flit, and a third FEC code corresponding to third TLPs of the flit, the first TLPs, second TLPs, and third TLPs being interleaved across symbols of the flit.

25. The one or more computer-readable storage media of claim 15, wherein the plurality of FEC codes comprises a first FEC code corresponding to first TLPs of the flit, a second FEC code corresponding to second TLPs of the flit, and a third FEC code corresponding to third TLPs of the flit, the first TLPs, second TLPs, and third TLPs being interleaved across symbols of the flit.

* * * * *